US011250260B2

(12) United States Patent
Bader et al.

(10) Patent No.: US 11,250,260 B2
(45) Date of Patent: Feb. 15, 2022

(54) AUTOMATED PROCESS FOR DYNAMIC MATERIAL CLASSIFICATION IN REMOTELY SENSED IMAGERY

(71) Applicant: Maxar Intelligence Inc., Westminster, CO (US)

(72) Inventors: Brett W. Bader, Lyons, CO (US); Beth Stein, Denver, CO (US); Seth Malitz, Aurora, CO (US)

(73) Assignee: MAXAR INTELLIGENCE INC., Westminster, CO (US)

( * ) Notice: Subject to any disclaimer, the term of this patent is extended or adjusted under 35 U.S.C. 154(b) by 96 days.

(21) Appl. No.: 16/685,977

(22) Filed: Nov. 15, 2019

(65) Prior Publication Data

US 2021/0150183 A1 May 20, 2021

(51) Int. Cl.
*G06K 9/00* (2006.01)
*G06K 9/62* (2022.01)

(52) U.S. Cl.
CPC ......... *G06K 9/0063* (2013.01); *G06K 9/6257* (2013.01); *G06K 2009/00644* (2013.01)

(58) Field of Classification Search
CPC ............... G06K 9/0063; G06K 9/6257; G06K 2009/00644
USPC .......................................................... 382/165
See application file for complete search history.

(56) References Cited

U.S. PATENT DOCUMENTS 8,626,682 B2  1/2014  Malik et al.

9,001,311 B2  4/2015  Leonard et al.
9,230,168 B2  1/2016  Gueguen
9,396,528 B2  7/2016  Pacifici
(Continued)

FOREIGN PATENT DOCUMENTS

CN   103292930 A    9/2013
KR   10-1922831 B1  11/2018

OTHER PUBLICATIONS

Bader, "Automated Concrete/Asphalt Detection Based on Sensor Time Delay," U.S. Appl. No. 16/685,990, filed Nov. 15, 2019.

(Continued)

*Primary Examiner* — Michael R Neff
(74) *Attorney, Agent, or Firm* — Vierra Magen Marcus LLP

(57) ABSTRACT

An automated system is provided for classifying materials in remotely-sensed imagery based on automated construction of a dynamic classifier—namely, a classifier that is automatically trained on the same image to which it is then subsequently applied. A first automated process identifies high confidence exemplars of each class using tailored classification techniques. This data is then used to train a supervised classification model (e.g., discriminant analysis), and the resultant classifier is applied to other pixels in the image that are unclassified or uncertain. Dynamic classification is automatically customized to the current image and can yield a more accurate and efficient material classification versus a static (image-independent) or manually trained classifier. It can overcome various confounding factors including inconsistencies in radiometric calibration, atmospheric conditions, and atmospheric distortions of ground spectra; different viewing and illumination geometries; and regional variations in the composition of certain materials like asphalt and concrete.

17 Claims, 20 Drawing Sheets

(56) References Cited

U.S. PATENT DOCUMENTS

| | | | |
|---|---|---|---|
| 9,466,144 | B2 | 10/2016 | Sharp et al. |
| 9,495,635 | B2 | 11/2016 | Malik et al. |
| 9,589,210 | B1 | 3/2017 | Estrada et al. |
| 9,990,705 | B2 | 6/2018 | Pacifici |
| 10,289,925 | B2 | 5/2019 | Farooqi et al. |
| 2015/0371089 | A1 | 12/2015 | Tabb |
| 2015/0371115 | A1* | 12/2015 | Marchisio ............ G06K 9/4604 382/159 |
| 2015/0379431 | A1 | 12/2015 | Stokes et al. |
| 2016/0026848 | A1 | 1/2016 | Hamid et al. |
| 2017/0235767 | A1 | 8/2017 | Tusk |
| 2017/0270674 | A1 | 9/2017 | Shrivastava |
| 2019/0130547 | A1 | 5/2019 | Pacifici |
| 2019/0163768 | A1 | 5/2019 | Gulati et al. |
| 2019/0294923 | A1 | 9/2019 | Riley et al. |
| 2020/0134833 | A1* | 4/2020 | Biswas ................. G06K 9/342 |
| 2020/0193206 | A1* | 6/2020 | Turkelson .......... G06K 9/00671 |
| 2020/0320293 | A1* | 10/2020 | Yang ......................... G06T 7/40 |
| 2020/0359777 | A1* | 11/2020 | Pesach .................. A61C 17/34 |

OTHER PUBLICATIONS

Digitalglobe, "WorldView-3," Data Sheet, [www.digitalglobe.com], DS-WV3 Rev. Jan. 2013, Jan. 2013, 2 pages.

PCT International Search Report dated May 20, 2021, PCT Patent Application No. PCT/US2020/060458.

PCT Written Opinion of the International Searching Authority dated May 20, 2021, PCT Patent Application No. PCT/US2020/060458.

Patel Hetul et al, "Crop Identification and Discrimination Using AVIRIS-NG Hyperspectral Data Based on Deep Learning Techniques", IGARSS 2019—2019 IEEE International Geoscience and Remote Sensing Symposium, IEEE, Jul. 28, 2019 (Jul. 28, 2019), p. 3728-3731, XP033655369 DOI: 10.1109/IGARSS.2019.8897897 external link.

* cited by examiner

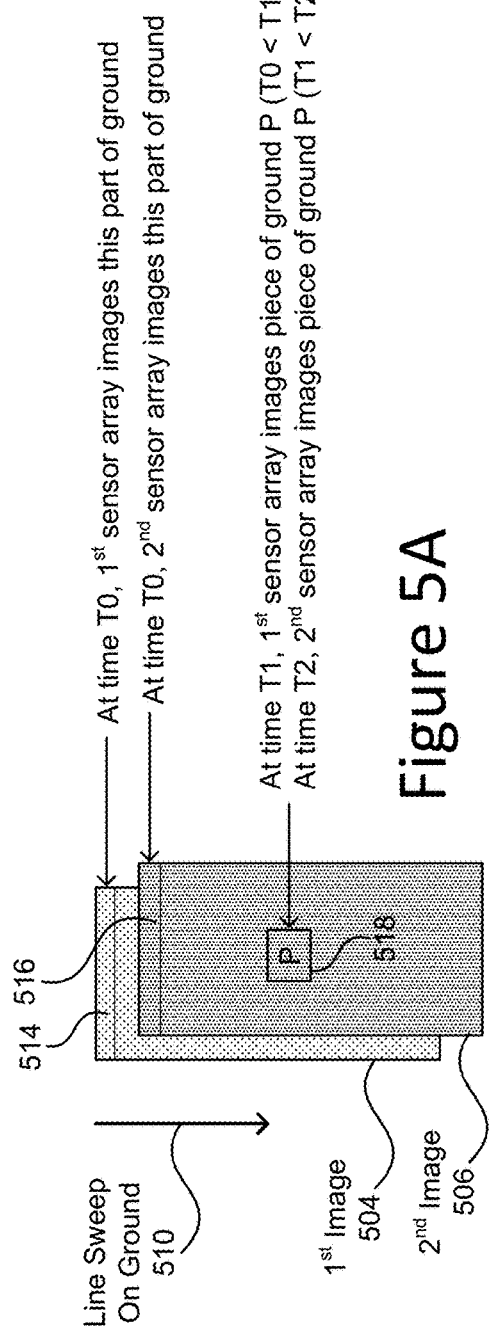
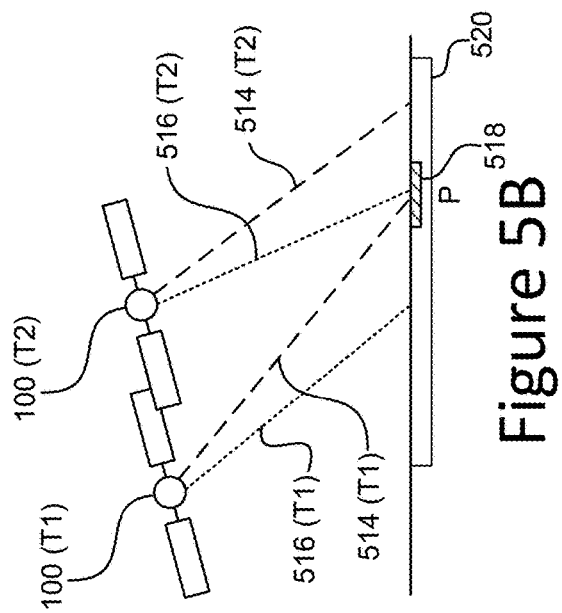

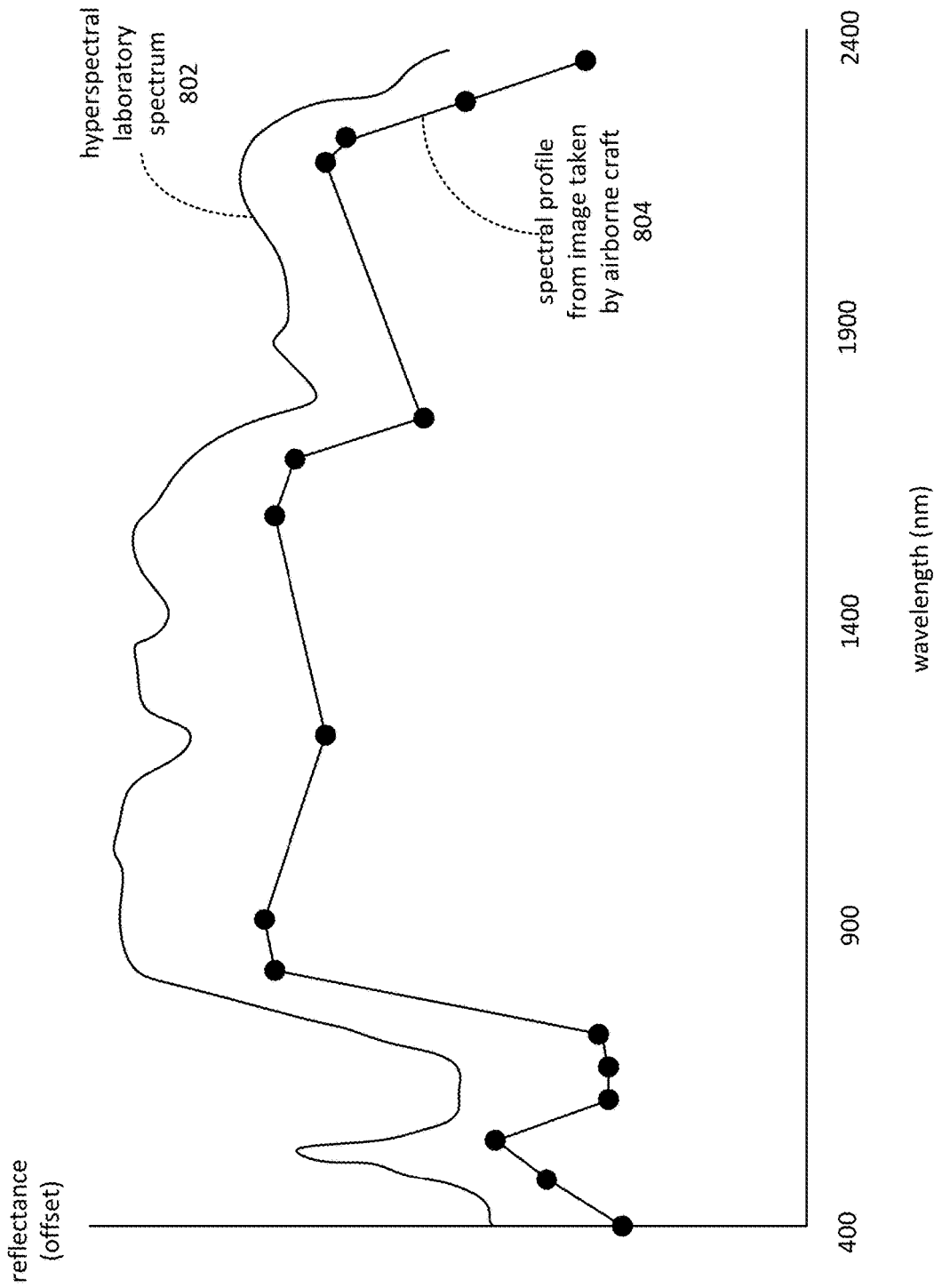

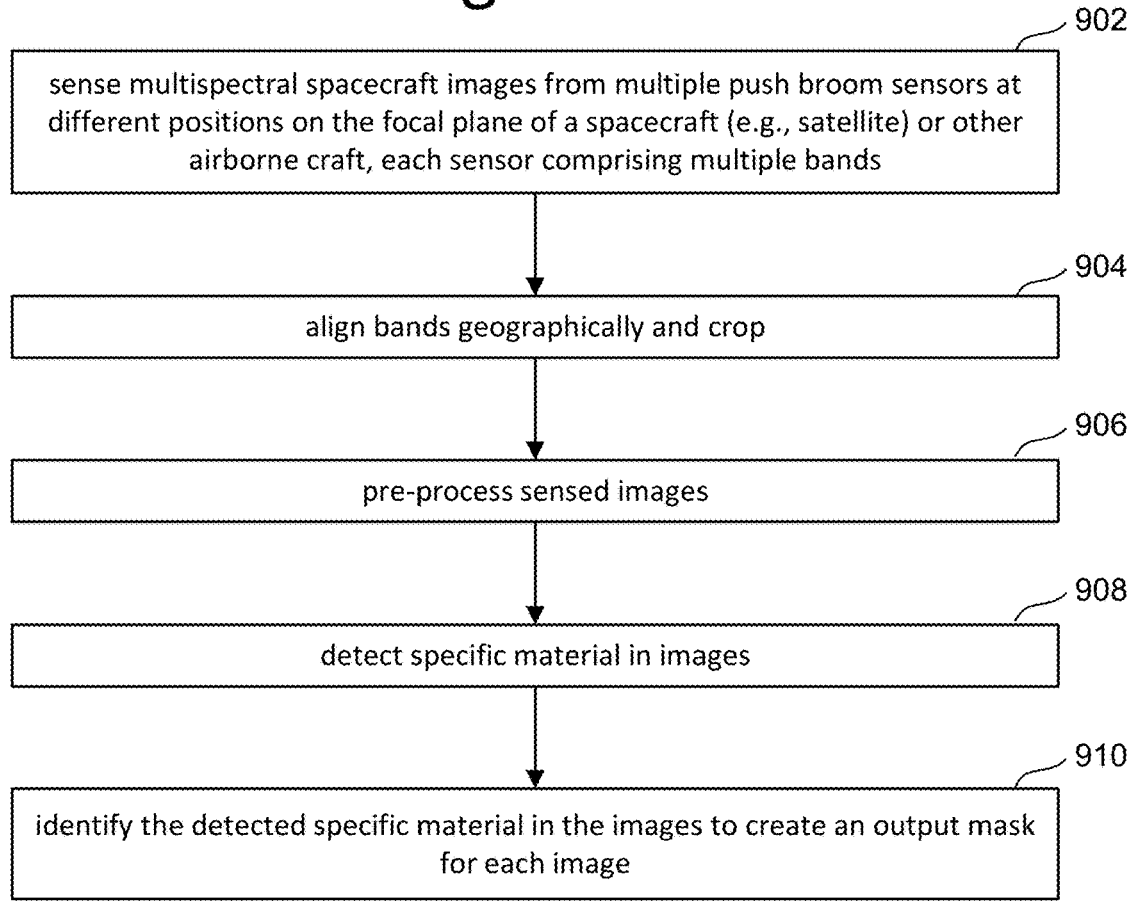
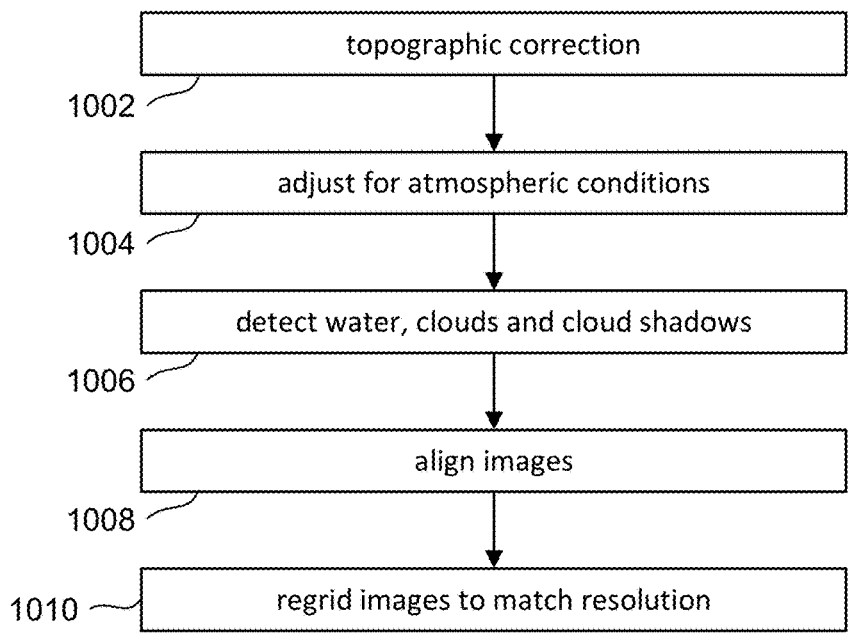

detailed asphalt/concrete flow

Figure 12B

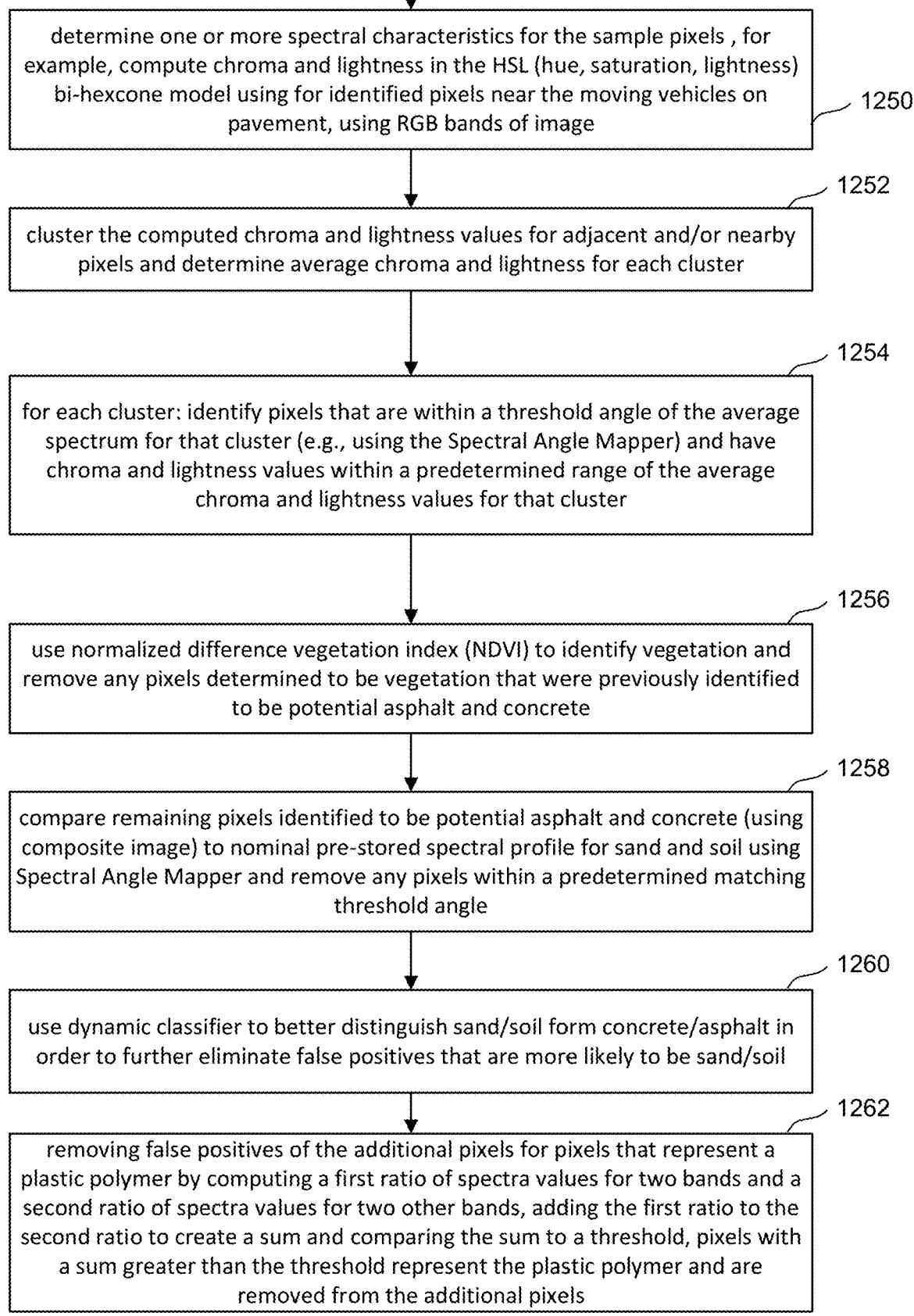

A
↓

1250 — determine one or more spectral characteristics for the sample pixels, for example, compute chroma and lightness in the HSL (hue, saturation, lightness) bi-hexcone model using for identified pixels near the moving vehicles on pavement, using RGB bands of image 1252 — cluster the computed chroma and lightness values for adjacent and/or nearby pixels and determine average chroma and lightness for each cluster 1254 — for each cluster: identify pixels that are within a threshold angle of the average spectrum for that cluster (e.g., using the Spectral Angle Mapper) and have chroma and lightness values within a predetermined range of the average chroma and lightness values for that cluster 1256 — use normalized difference vegetation index (NDVI) to identify vegetation and remove any pixels determined to be vegetation that were previously identified to be potential asphalt and concrete 1258 — compare remaining pixels identified to be potential asphalt and concrete (using composite image) to nominal pre-stored spectral profile for sand and soil using Spectral Angle Mapper and remove any pixels within a predetermined matching threshold angle 1260 — use dynamic classifier to better distinguish sand/soil form concrete/asphalt in order to further eliminate false positives that are more likely to be sand/soil 1262 — removing false positives of the additional pixels for pixels that represent a plastic polymer by computing a first ratio of spectra values for two bands and a second ratio of spectra values for two other bands, adding the first ratio to the second ratio to create a sum and comparing the sum to a threshold, pixels with a sum greater than the threshold represent the plastic polymer and are removed from the additional pixels

AUTOMATED PROCESS FOR DYNAMIC MATERIAL CLASSIFICATION IN REMOTELY SENSED IMAGERY

BACKGROUND

The use of geospatial imagery (e.g., satellite imagery) has continued to increase. As such, high quality geospatial imagery has become increasingly valuable. For example, a variety of different entities (e.g., government entities, corporations, universities, individuals, or others) may utilize satellite imagery. As may be appreciated, the use of such satellite imagery may vary widely such that satellite images may be used for a variety of differing purposes.

Many entities utilize geospatial imagery in order to learn about regions on the Earth. For example, an entity may want to know about the presence or absence of materials in a specific region. However, due to the large number of images available and the large amount of data, it is often not practical for a human to manually review geospatial imagery. Therefore, systems have been developed to automate the detection of materials in images, including using machine learning to identify materials in images.

One problem with automating the identification of materials in images is that the composition of some materials may vary by region or change over time. This variance may be due to availability of raw materials in different regions, different geology of the local ingredients, different customs for manufacturing, different formulations (e.g., recipes) used in different regions, aging of materials, weathering of materials, and/or different atmospheric conditions in different regions. Another problem is that the image collection characteristics and subsequent image processing (atmospheric compensation) make the data unique. These variances have made it difficult to develop a reliable automated system to detect materials in images.

Other reasons making it difficult to develop automated systems for identifying materials include inconsistent atmospheric conditions, inconsistent upstream radiometric calibration, inconsistent upstream ability to remove atmospheric effects (particularly water vapor and aerosols), and different viewing geometry.

BRIEF DESCRIPTION OF THE DRAWINGS

FIG. 5A depicts two bands of a composite image captured by a satellite (or other airborne craft) that is part of an image collection and distribution system that can implement various embodiments of the proposed technology.

FIG. 5B shows a satellite at two positions in orbit above the Earth.

FIG. 8 is a graph of a spectral profile for a material.

FIG. 9 is a flow chart describing one embodiment of a process for operating an image collection and distribution system that can implement various embodiments of the proposed technology.

FIG. 10 is a flow chart describing one embodiment of a process for pre-processing an image.

FIGS. 12A and 12B together are a flow chart describing one embodiment of a process for detecting concrete and/or asphalt.

DETAILED DESCRIPTION

Figure 1:
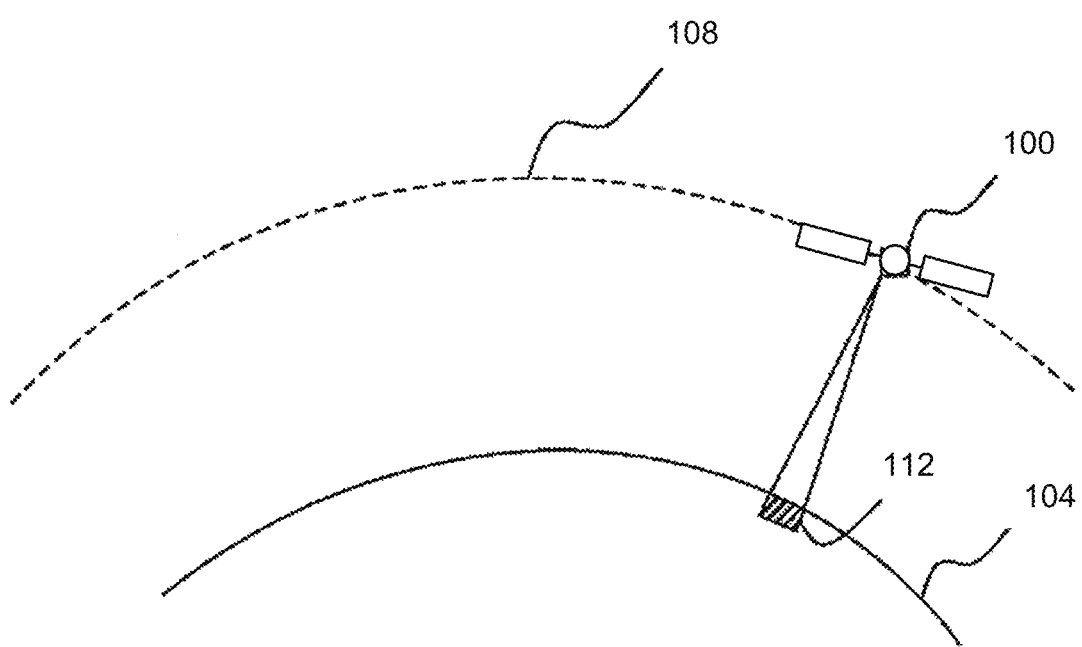
FIG. 1 illustrates how a satellite orbiting a planet can be used to obtain images of the Earth. This satellite can be used as part of an image collection and distribution system that can implement various embodiments of the proposed technology.

Technology is proposed for automatically (without human intervention) identifying a material in an image (e.g., an image captured at a satellite or other airborne craft) that takes into account variances, such as local variations of the material specific to the region and/or time in the image, and/or local variations in the reflectance (appearance) of the material (irrespective of actual material differences) due to atmospheric or image acquisition characteristics (e.g. illumination, bi-direction reflectance distribution function, etc.)

One embodiment of the proposed technology includes using machine learning technology in the form of a dynamic classifier that is the result of training a classification model using data from the same image to which the trained classifier is subsequently applied. Example implementations comprise performing a first process to identify a first set of pixels in the image that represent the material with high confidence. That first set of pixels is then used to train a classification model (which is an adaptive process). Once the classification model is trained, the trained classifier is used to identify additional pixels in the first image that represent the material. Training the classification model using pixel data from the same image that the trained classifier analyzes enables the trained classifier to account for the variations discussed above.

One example implementation includes an automated system for classifying materials in remotely-sensed imagery based on automated construction of a dynamic classifier—namely, a classifier that is automatically trained on the same image to which it is then subsequently applied. In this system, a first automated process identifies high confidence exemplars of each class using tailored classification techniques. This data is then used to train a supervised classification model (e.g., discriminant analysis), and the resultant classifier is applied to other pixels in the image that are unclassified or uncertain. Dynamic classification is customized to the current image and can yield more accurate material classification versus a static (image-independent) classifier. It can overcome various confounding factors including inconsistencies in radiometric calibration, atmospheric conditions, and atmospheric distortions of ground spectra; different viewing and illumination geometries; and regional variations in the composition of certain materials like asphalt and concrete.

Another embodiment of the proposed technology includes leveraging indications of movement in an image in order to identify materials in the image. For example, concrete and/or asphalt (or other materials) can be identified in a multispectral image that has multiple bands including a first set of bands from a first sensor and a second set of bands from a second sensor. The second sensor is at a different position on a focal plane as compared to the first sensor so that a single location depicted in the multispectral image will have been sensed at different times by the first sensor and the second sensor. The system identifies moving vehicles in the multispectral image using a band from the first sensor and a band from the second sensor, and subsequently identifies sample pixels of the pavement in the multispectral image that are near the moving vehicles. These sample pixels are very likely roads made of concrete and/or asphalt (or other material). Additional pixels are identified in the multispectral image that have spectral characteristics that are within a threshold of spectral characteristics of the sample pixels. These additional pixels also depict concrete and/or asphalt. Finding pixels for roads based on moving vehicles and using those pixels to identify other pixels with the same/similar spectral characteristics enables the system to account for the variations discussed above. In one embodiment, a multispectral image includes a super-spectral and/or hyper-spectral image.

The above-described technique for leveraging indications of movement in an image in order to identify material in the image can be used as a stand-alone process, or can be used as the first process for identifying the first set of pixels in the image that represent the material with high confidence and that are used to train the classification model in embodiments that include using machine learning technology.

FIG. 1 depicts a satellite 100 orbiting a planet 104 (e.g., Earth, another planet or another object). Satellite 100 can be used to capture the images analyzed using the technology proposed herein. At the outset, it is noted that, when referring to the Earth herein, reference is made to any body or object of which it may be desirable to acquire images or other remote sensing information. Furthermore, when referring to a satellite herein, reference is made to any spacecraft, satellite, aircraft and/or other airborne craft capable of acquiring images. Furthermore, the system described herein may also be applied to other imaging systems, including imaging systems located on the Earth or in space that acquire images of other celestial bodies or objects. It is also noted that none of the drawing figures contained herein are drawn to scale, and that such figures are for the purposes of discussion and illustration only.

As illustrated in FIG. 1, satellite 100 orbits the Earth 104 following an orbital path 108. An imaging system aboard the satellite 100 is capable of acquiring an image of a portion 112 of the surface of the Earth 104, which portion 112 can also be referred to as a geographic region (or region). An image that is obtained by the satellite 100 includes a plurality of pixels. Furthermore, the satellite 100 may collect images in a number of spectral bands. In certain embodiments, the imaging system aboard the satellite 100 collects multiple bands of electromagnetic energy, wherein each band is collected by a separate image sensor element that is adapted to collect electromagnetic radiation within a corresponding spectral range. More specifically, an image obtained by the imaging system aboard the satellite 100 can be a multispectral image (MSI) where image data is captured at specific wavelength bands across the electromagnetic spectrum. That is, one or more image sensors (e.g., provided on a satellite imaging system) may have a plurality of specifically designed sensor elements capable of detecting light within a predetermined range of wavelengths.

For a specific example, the WorldView-2 low Earth orbiting satellite operated by DigitalGlobe, Inc. (which is part of Maxar Technologies Inc. of Westminster, Colo.), collects image data in eight visible and near infrared (VNIR) spectral bands, including, for example, a coastal (C) band (400-450 nm), a blue (B) band (450-510 nm), a green (G) band (510-580 nm), a yellow (Y) band (585-625 nm), a red (R) band (630-690 nm), a red edge (RE) band (705-745 nm), a near-infrared 1 (N1) band (770-895 nm), and a near-infrared 2 (N2) band (860-1040 nm). For another example, the WorldView-3 low Earth orbiting satellite operated by DigitalGlobe, Inc., in addition to collecting image data in the eight VNIR spectral bands mentioned above (i.e., the C, B, G, Y, R, RE, N1, and N2 bands), also includes sensors to obtain image data in an additional eight spectral bands that are in the short-wavelength infrared range (SWIR). Such SWIR bands may include, for example, SWIR 1 (1195-1225 nm), SWIR 2 (1550-1590 nm), SWIR 3 (1640-1680 nm), SWIR 4 (1710-1750 nm), SWIR 5 (2145-2185 nm), SWIR 6 (2185-2225 nm), SWIR 7 (2235-2285 nm), and/or SWIR 8 (2295-2365 nm). Other combinations and/or ranges of SWIR bands generally from about 1195 nm to about 2400 nm may be provided in any combination.

In some embodiments, band definitions broader and/or narrower than those described above may be provided without limitation. In any regard, there may be a plurality of band values corresponding to gray level values for each band for each given pixel in a portion of multispectral image data. There may also be a panchromatic sensor capable of detecting black and white imagery (also referred to as a panchromatic band) in the wavelength band of 450-800 nm. Further, the image data obtained by a satellite imaging system may include metadata that includes supplementary data regarding the acquisition of the image. For instance, image metadata that may accompany and/or form a portion of the image data may include satellite parameters (e.g., off nadir satellite angles, satellite attitudes, solar elevation angles, etc.), time/date of acquisition, and/or other appropriate parameters may be attributed to the metadata of an image.

Figure 2:
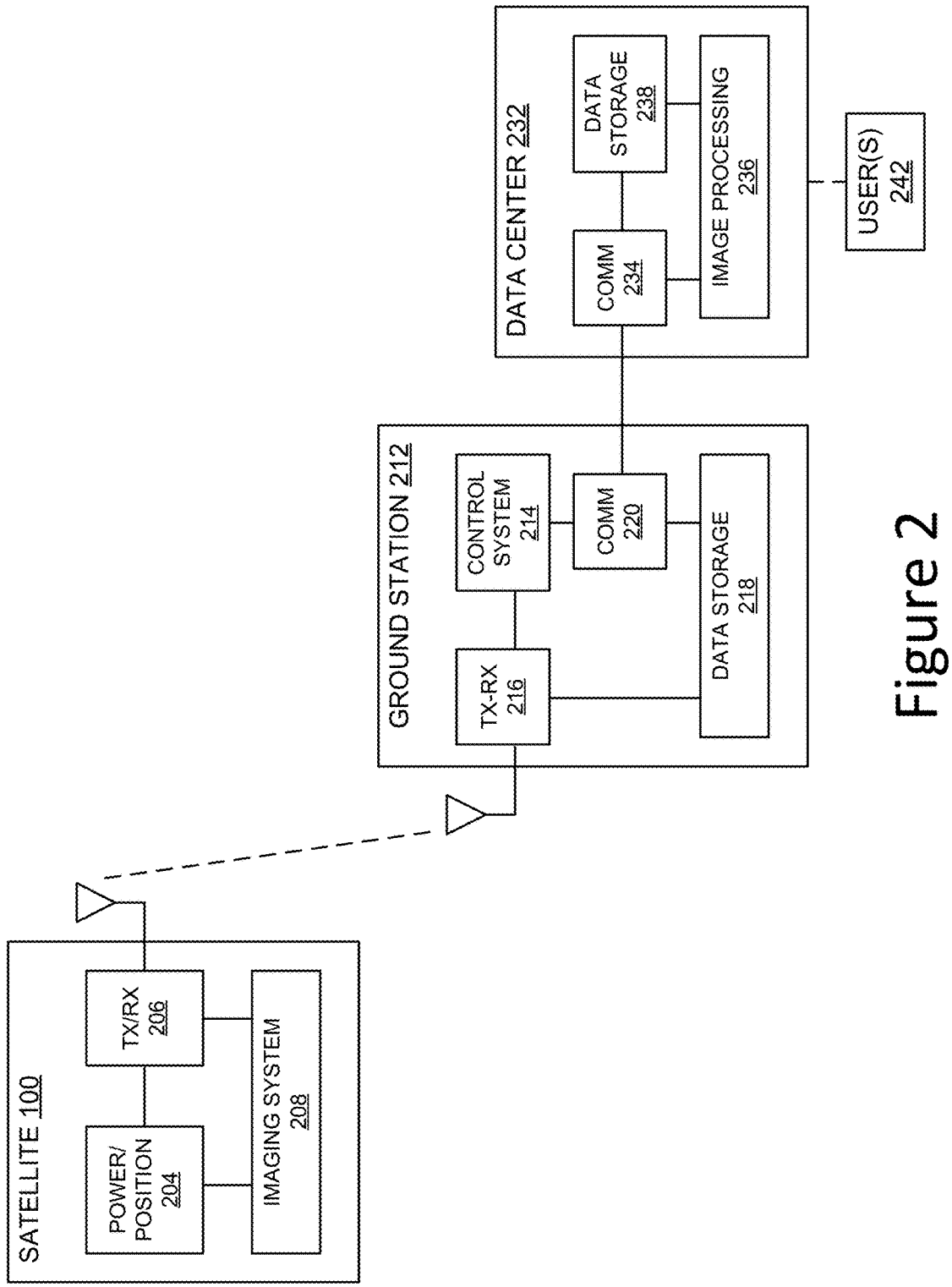
FIG. 2 is a high-level block diagram of an image collection and distribution system that can implement various embodiments of the proposed technology.

Referring now to FIG. 2, a block diagram representation of an image collection and distribution system 200 is shown therein. In this embodiment, the satellite 100 includes a number of subsystems, including power/positioning subsystem 204, a transmit/receive subsystem 206, and an imaging subsystem 208. Each of the aforementioned subsystems can also be referred to more succinctly as a system, e.g., the imaging subsystem 208 can also be referred to as the imaging system 208. The power/positioning subsystem 204 receives power and can be used to position that satellite 100 and/or the imaging system 208 to collect desired images, as is well known in the art. The TX/RX subsystem 206 can be used to transmit and receive data to/from a ground location and/or other satellite systems, as is well known in the art. The imaging system 208, in certain embodiments, includes one or more multispectral (MS) sensor arrays that collect electromagnetic energy within multiple (e.g., 4, 8, or 16) bands of electromagnetic energy, wherein a band of electromagnetic energy can also be referred to as a range of frequencies. In other words, each of the sensors collects electromagnetic energy falling within a respective preset band that is received at the sensor. Examples of such bands were discussed above. The imaging sensors, which can also be referred to as image sensors, can include charge coupled device (CCD) arrays and associated optics to collect electromagnetic energy and focus the energy at the CCD arrays. The CCD arrays can be configured to collect energy from a specific energy band by a mass of optical filters. The sensors can also include electronics to sample the CCD arrays and output a digital number (DN) that is proportional to the amount of energy collected at the CCD array. Each CCD array includes a number of pixels, and in accordance with certain embodiments, the imaging system operates as a push broom imaging system. Thus, a plurality of DNs for each pixel can be output from the imaging system to the transmit/receive system 206. The use of other types of sensors, besides a CCD array, is also possible and within the scope of the embodiments described herein. For a nonlimiting example, an alternative type of sensor that can be used in place of CCD type sensors is complementary metal-oxide-semiconductor (CMOS) type sensors.

The satellite 100 transmits to and receives data from a ground station 212. In one embodiment, ground station 212 includes a transmit/receive system 216, a data storage system 218, a control system 214, and a communication system 220, each of which can also be referred to as a subsystem. While only one ground station 212 is shown in FIG. 2, it is likely that multiple ground stations 212 exist and are able to communicate with the satellite 100 throughout different portions of the satellite's orbit. The transmit/receive system 216 is used to send and receive data to and from the satellite 100. The data storage system 218 may be used to store image data collected by the imaging system 208 and sent from the satellite 100 to the ground station 212. The control system 214 can be used for satellite control and can transmit/receive control information through the transmit/receive system 216 to/from the satellite 100. The communication system 220 is used for communications between the ground station 212 and one or more data centers 232.

Data center 232 includes a communication system 234, a data storage system 238, and an image processing system 236, each of which can also be referred to as a subsystem. The image processing system 236 processes the data from the imaging system 208 and provides a digital image to one or more user(s) 242. Certain operations of the image processing system 236, according to certain embodiments of the proposed technology, will be described in greater detail below. That is, in some embodiments, the processes discussed below for identifying a material in an image are performed by image processing system 236. Alternatively, the image data received from the satellite 100 at the ground station 212 may be sent from the ground station 212 to a user 242 directly. The image data may be processed by the user (e.g., a computer system operated by the user) using one or more techniques described herein to accommodate the user's needs.

Figure 2A:
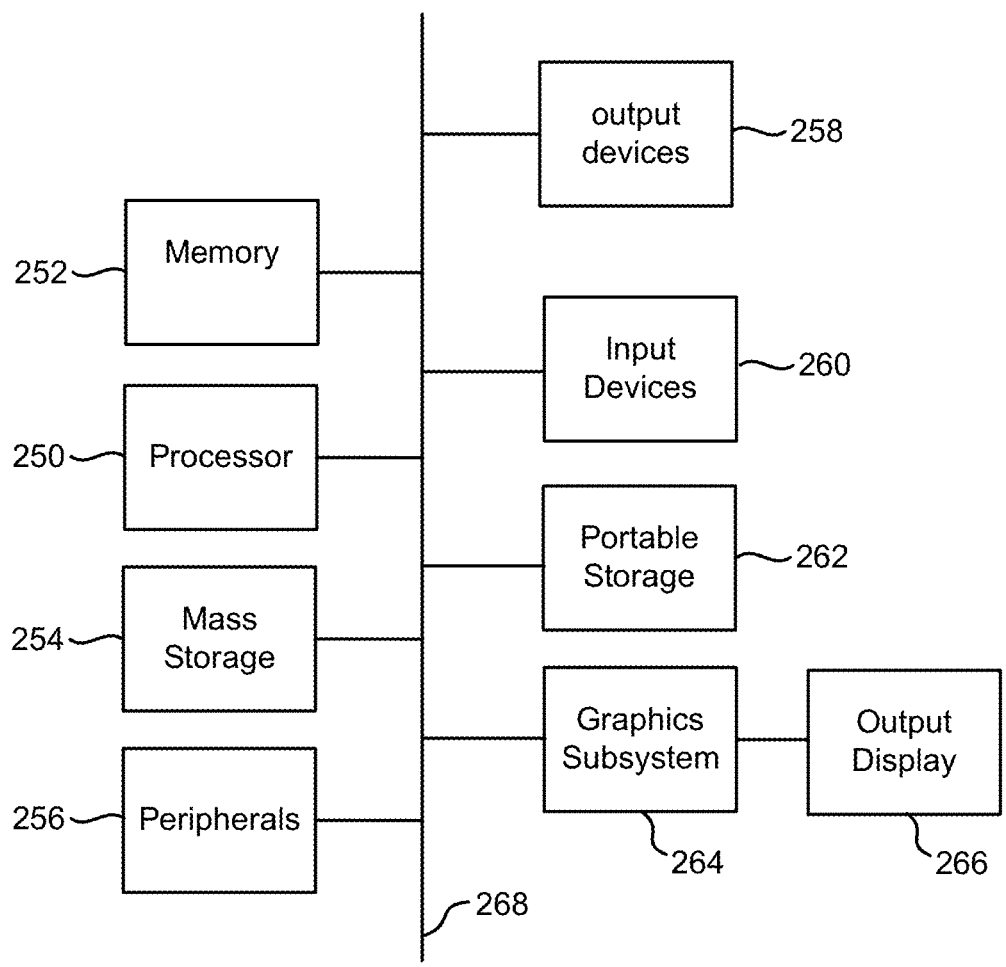
FIG. 2A depicts an example of a computing system that can perform the processes discussed herein. This computing system can be used to implement one or more of the components of an image collection and distribution system that can implement various embodiments of the proposed technology.

FIG. 2A is a block diagram of one example embodiment of a computing system that can be used to implement image processing system 236 and perform the processes discussed below for detecting materials in images from satellite 100. The computer system of FIG. 2A includes a processor 250 and main memory 252. Processor 250 may contain a single microprocessor, or may contain a plurality of microprocessors for configuring the computer system as a multi-processor system. Main memory 252 stores, in part, instructions and data for execution by processor 250. In embodiments where the proposed technology is wholly or partially implemented in software, main memory 252 can store the executable code when in operation. Main memory 252 may include banks of dynamic random access memory (DRAM) as well as high speed cache memory.

The system of FIG. 2A further includes a mass storage device 254, peripheral device(s) 226, user input device(s) 260, output devices 258, portable storage medium drive(s) 262, a graphics subsystem 264 and an output display 266. For purposes of simplicity, the components shown in FIG. 2A are depicted as being connected via a single bus 268. However, the components may be connected through one or more data transport means. For example, processor 250 and main memory 252 may be connected via a local microprocessor bus, and the mass storage device 254, peripheral device(s) 226, portable storage medium drive(s) 262, and graphics subsystem 264 may be connected via one or more input/output (I/O) buses. Mass storage device 254, which may be implemented with a magnetic disk drive or an optical disk drive or a solid state drive, and is a non-volatile storage device for storing data and instructions for use by processor 250. In one embodiment, mass storage device 254 stores the system software for implementing the proposed technology for purposes of loading to main memory 252.

Portable storage medium drive 262 operates in conjunction with a portable non-volatile storage medium, such as a flash device, to input and output data and code to and from the computer system of FIG. 2A. In one embodiment, the system software for implementing the proposed technology is stored on such a portable medium, and is input to the computer system via the portable storage medium drive 262. Peripheral device(s) 226 may include any type of computer support device, such as an input/output (I/O) interface, to add additional functionality to the computer system. For example, peripheral device(s) 226 may include a network interface for connecting the computer system to a network, a modem, a router, etc.

User input device(s) 260 provides a portion of a user interface. User input device(s) 260 may include an alpha-numeric keypad for inputting alpha-numeric and other information, or a pointing device, such as a mouse, a trackball, stylus, or cursor direction keys. In order to display textual and graphical information, the computer system of FIG. 2A includes graphics subsystem 264 and output display 266 (e.g., a monitor). Graphics subsystem 264 receives textual and graphical information, and processes the information for output to display 266. Additionally, the system of FIG. 2A includes output devices 258. Examples of suitable output devices include speakers, printers, network interfaces, monitors, etc.

Figure 3A:
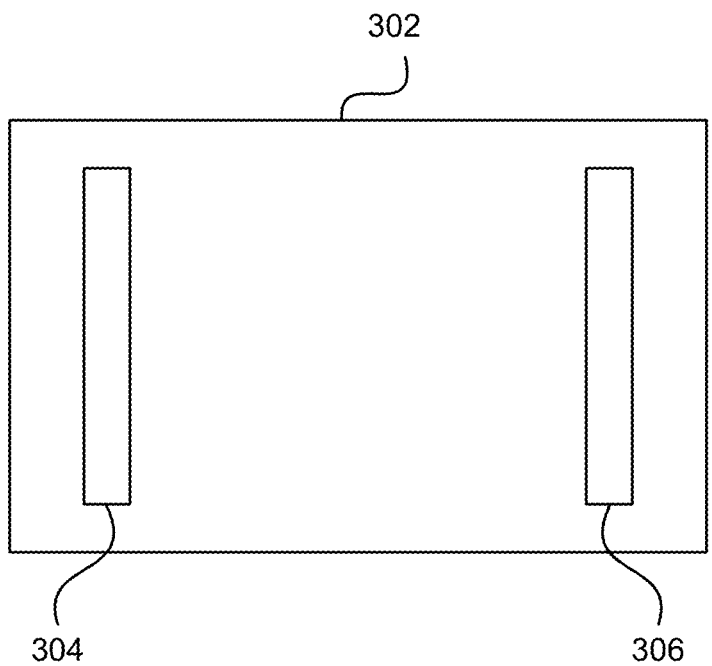
FIG. 3A illustrates an exemplary top view of a sensor assembly that can be carried by a satellite.
Figure 3B:
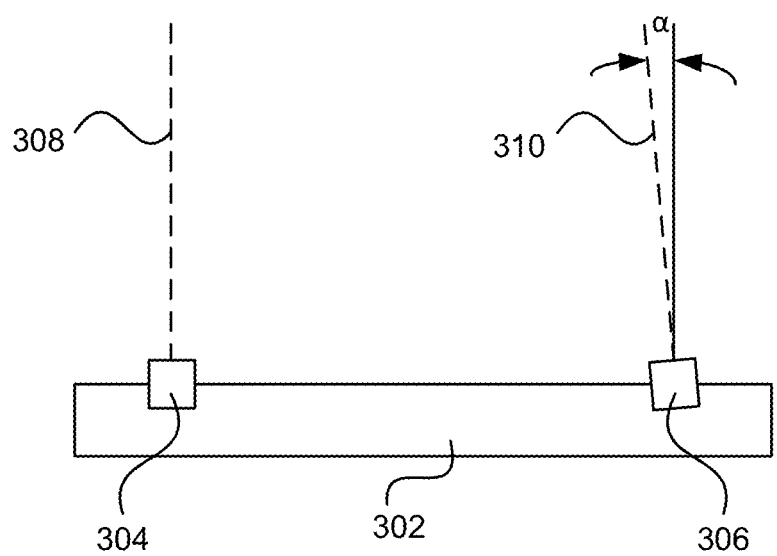
FIG. 3B illustrates an exemplary side view of the sensor assembly of FIG. 3A.

FIG. 3A illustrates an exemplary top view of a sensor assembly 302 of the imaging system 208 that can be carried by the satellite 100, and FIG. 3B illustrates an exemplary side view of the sensor assembly 302. More specifically referring to FIGS. 3A and 3B, the imaging system 208 can include first and second multispectral (MS) sensor arrays 304 and 306, which can also be referred to as the MS1 sensor 304 and the MS2 sensor 306. The MS1 sensor 304 and the MS2 sensor 306 can be considered parts of the sensor assembly 302 that is carried by the satellite 100. Each of the MS1 and MS2 sensors 304, 306 can include thousands of image sensor elements generally aligned in one or more rows arranged generally perpendicular to the flight direction of the satellite 100, thereby enabling images to be captured one or more rows at a time, as is done in a push broom imaging system.

In one embodiment, the MS1 sensor 304 includes one or more rows of image sensor elements that collect image data in the blue (B) band (450-510 nm), green (G) band (510-580 nm), red (R) band (630-690 nm), and near-infrared 1 (N1) band (770-895 nm); and the MS2 sensor 306 includes one or more rows of image sensor elements that collect image data in the coastal blue (C) band (400-450 nm), yellow (Y) band (585-625 nm), red edge (RE) band (705-745 nm), and near-infrared 2 (N2) band (860-1040 nm). In other words, the MS1 sensor 304 collects image data in the B, G, R, and N1 bands; and the MS2 sensor 306 collects image data in the C, Y, RE, and N2 bands. Together, the MS1 and MS2 sensors 304, 306 collect or capture image data in the VNIR bands.

As can be appreciated from FIGS. 3A and 3B, the MS1 sensor 304 and the MS2 sensor 306 are physically spaced apart from one another. That is, the MS1 sensor 304 and the MS2 sensor 306 are at different positions on the focal plane of satellite 100. Referring to FIGS. 3A and 3B, the MS1 sensor 304 is designed together with an optical system of the satellite to receive radiant optical energy along a first primary axis 308, and the MS2 sensor 306 is designed together with the optical system of the satellite to receive radiant optical energy along a second primary axis 310, wherein an angle α between the first and second primary axes 306, 308 can also be referred to as a parallax angle α. The parallax angle α, which specifies the angular offset between the primary axes 308, 310, can be in the range of 0.05 degrees to 5 degrees, and in specific embodiments, is about 0.16 degrees, but is not limited thereto. As will be appreciated from the discussion below, certain embodiments of the present technology exploit the fact that the MS1 sensor 304 and the MS2 sensor 306 are physically and angularly offset from one another.

In one embodiment, both the MS1 sensor 304 and the MS2 sensor 306 are push broom sensors. There is a physical separation between the MS1 sensor 304 and the MS2 sensor 306 on the focal plane of the sensor assembly 302 that includes both sensors, as can be appreciated from FIGS. 3A and 3B. The MS1 sensor 304 can be used to produce a first image of a portion of the surface of the earth, while the MS2 sensor 306 produces a second image of a portion of the surface of the Earth. Because of the physical separation between the sensors 304 and 306 at the focal plane of the sensor assembly 302, the first and second images (produced using the sensor arrays 304 and 306, respectively) will have slight offsets in the top, bottom, and sides of the images, as will be described in further detail with reference to FIGS. 4 and 5. Each image that is obtained by a sensor includes image data, which can include spectral data and metadata, but is not limited thereto. In another embodiment, the MS1 sensor 304 and the MS2 sensor 306 are whisk broom sensors. In other embodiments, other types of sensors can be used.

Figure 4:
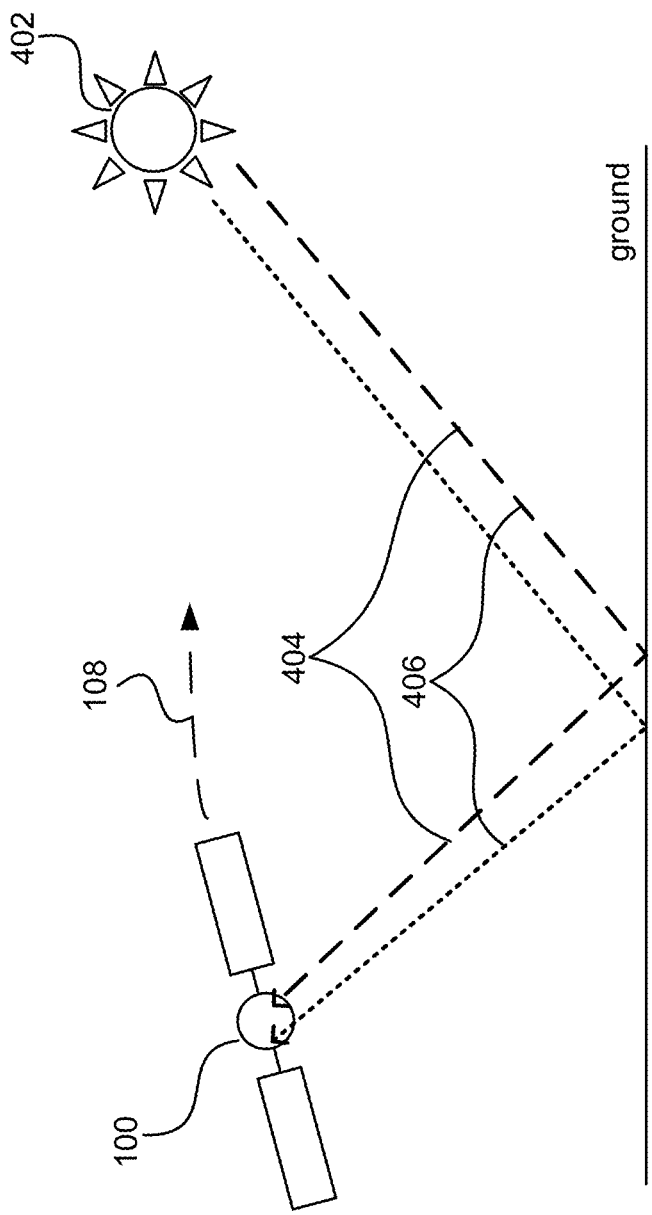
FIG. 4 depicts a satellite with two sensors.

Referring to FIG. 4, shown therein is the satellite 100 moving along the orbital path 108. FIG. 4 also shows that light emitted from the sun 402 is reflected off the surface of the Earth towards the satellite 100 such that first and second images of a portion of the surface of the Earth are captured by the MS1 and MS2 sensors, respectively. More specifically, the emitted and reflect light labeled 404 is imaged by the MS1 sensor 304 to produce the first image, and the emitted and reflected light labeled 406 is imaged by the MS2 sensor 306 to produce the second image. Explained another way, the MS1 sensor can be said to obtain first image data, and the MS2 sensor can be said to obtain second image data. FIG. 4 shows that at a given instant in time, the MS1 sensor array captures an image of a first location on Earth and the MS2 sensor array captures an image of a second location on Earth. Thus, for a particular location on Earth, the MS1 sensor array captures an image of the particular location on Earth at a first time and the MS2 sensor array captures an image of the same particular location on Earth at a second time that is after the first time. In other words, a single location depicted in a multispectral image from satellite 100 will have been sensed at different times by the MS1 sensor and the MS2 sensor.

FIG. 5A illustrates how first and second images 504 and 506, which are slightly offset from one another, are captured respectively by first and second sensors that are physically offset from one another on the focal plane of satellite 100. Such first and second sensors can be the MS1 sensor 304 and the MS2 sensor 306, discussed above, but are not limited thereto. The arrowed line labeled 510 in FIG. 5A represents the line sweep on the ground of the sensor arrays. Because of the physical offset of the first and second sensors, at a common time T0, the first and second sensors image different parts of the ground. In other words, at the time T0 the first and second sensors (e.g., 304, 306, respectively) capture the portions of the images 504, 506, respectively, which correspond to different parts of the ground. Nevertheless, the first and second sensors are sufficiently close to one another and are moving at the same time as one another relative to the ground such that a majority of the first and second images will correspond to the same portion of the ground, just captured at slightly different times with slightly different satellite viewing angles. For example, at a time T1 the first sensor (e.g., 304) images the portion of ground P (labeled 518), which same portion of ground P (labeled 518) is imaged by the second sensor (e.g., 306) at a time T2, where T1<T2 (i.e., T2 occurs after T1). This concept if further explained with reference to FIG. 5B. The portion of ground P (labeled 518) is shown as being part of a larger geographic region 520 for which the first sensor (e.g., 304) is used to obtain the first image 504, and for which the second sensor (e.g., 306) is used to obtain the second image 506. Associated with each of the first and second images 504, 506 is respective image data (e.g., pixels). More specifically, associated with the first image 504 is first image data that includes first image information about the geographic region 520, and associated with the second image 506 is second image data that includes second image information about the geographic region 520. For example, the first image information about the geographic region 520 (which is included in the first image data) can include B, G, R, and N1 band values for each pixel of N×M pixels included in the first image 504, and the second image information about the geographic region 520 (which is included in second image data) can include C, Y, RE, and N2 band values for each pixel of N×M pixels included in the second image 506.

FIG. 5B shows the satellite 100 (T1), which is the satellite 100 at the time T1, and the satellite 100 (T2), which is the satellite 100 at the time T2. The dashed line labeled 514 (T1) is used to show which portion of the ground the first sensor (e.g., 304) of the satellite is imaging at the time T1, and the dotted line labeled 516 (T1) is used to show which portion of the ground the second sensor (e.g., 306) of the satellite is imaging at the time T1. Notice that at the time T1, the first sensor (e.g., 304) is imaging the portion of ground P (labeled 518), and that it is not until the time T2 (where T1<T2) that the second sensor (e.g., 306) is imaging the portion of the ground P (labeled 518). Certain embodiments of the present technology take advantage of this arrangement to detect moving objects. For example, since the first and second sensors image the same portion of the ground at different times, if a feature is moving at the portion of the ground P (labeled 518), then the moving feature will appear at different places in the image data captured by the first and second sensors.

Figure 6:
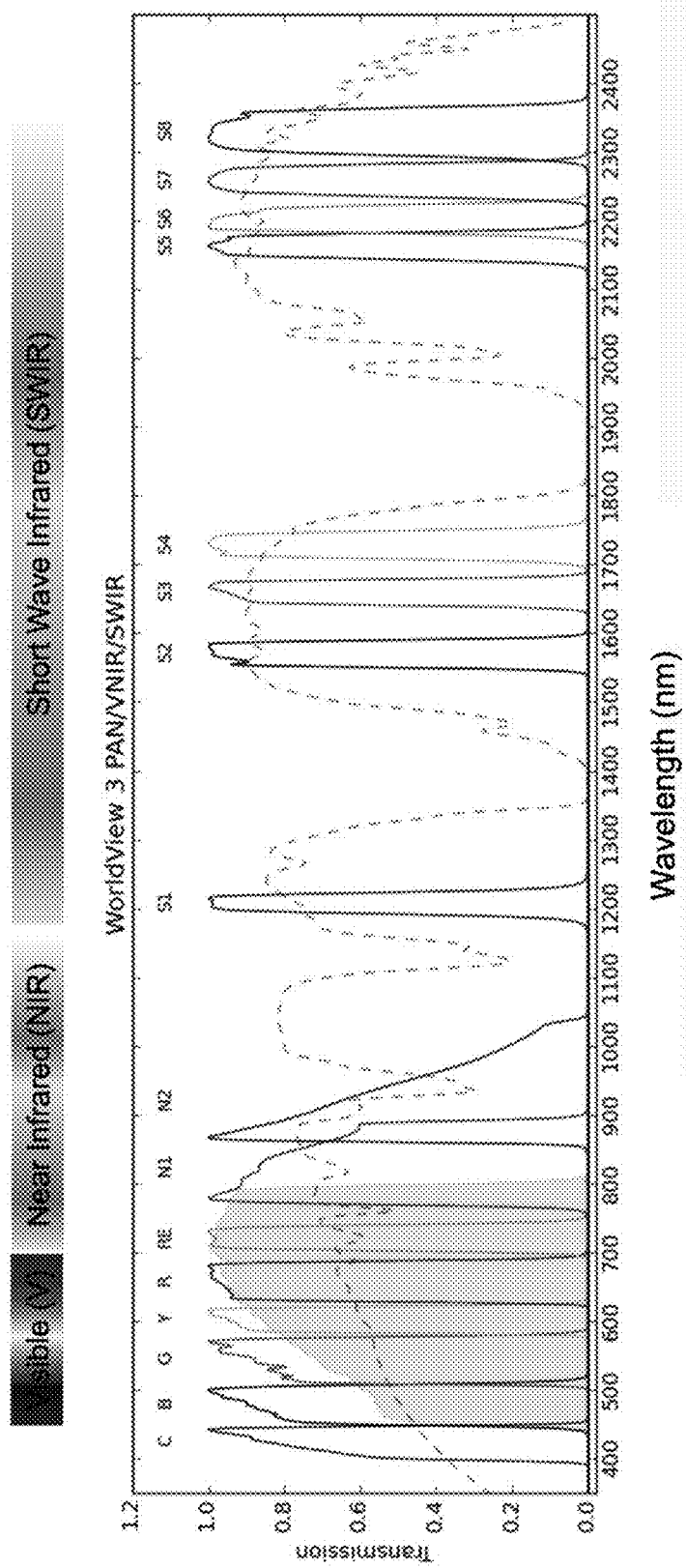
FIG. 6 defines the various bands of one embodiment of a satellite imaging system that is part of an image collection and distribution system that can implement various embodiments of the proposed technology.

As discussed above, in one embodiment the MS1 sensor 304 and the MS2 sensor 306 each capture image data for four bands. For example, FIG. 5A shows that MS1 sensor 304 captures image 504 and MS2 sensor 306 captures image 506. These two images 504/506 are aligned geographically and then have their edges trimmed, so that they match and form eight VNIR bands of a multispectral image. In one embodiment, satellite 100 also includes one or more additional sensors that sense an additional eight SWIR bands which are combined with the eight VNIR bands to form sixteen bands of a multispectral image. FIG. 6 defines the sixteen bands for one embodiment of the satellite imaging system that is part of an image collection and distribution system that can be used to implement various embodiments of the present technology. Specifically, FIG. 6 depicts a coastal (C) band (400-450 nm), a blue (B) band (450-510 nm), a green (G) band (510-580 nm), a yellow (Y) band (585-625 nm), a red (R) band (630-690 nm), a red edge (RE) band (705-745 nm), a near-infrared 1 (N1) band (770-895 nm), a near-infrared 2 (N2) band (860-1040 nm), S1 band (1195-1225 nm), S2 (1550-1590 nm), S3 band (1640-1680 nm), S4 band (1710-1750 nm), S5 band (2145-2185 nm), S6 band (2185-2225 nm), S7 band (2235-2285 nm), and S8 band (2295-2365 nm). Other combinations and/or ranges of VNIR and SWIR bands generally from about 1195 nm to about 2400 nm may be provided in any combination.

Figure 7:
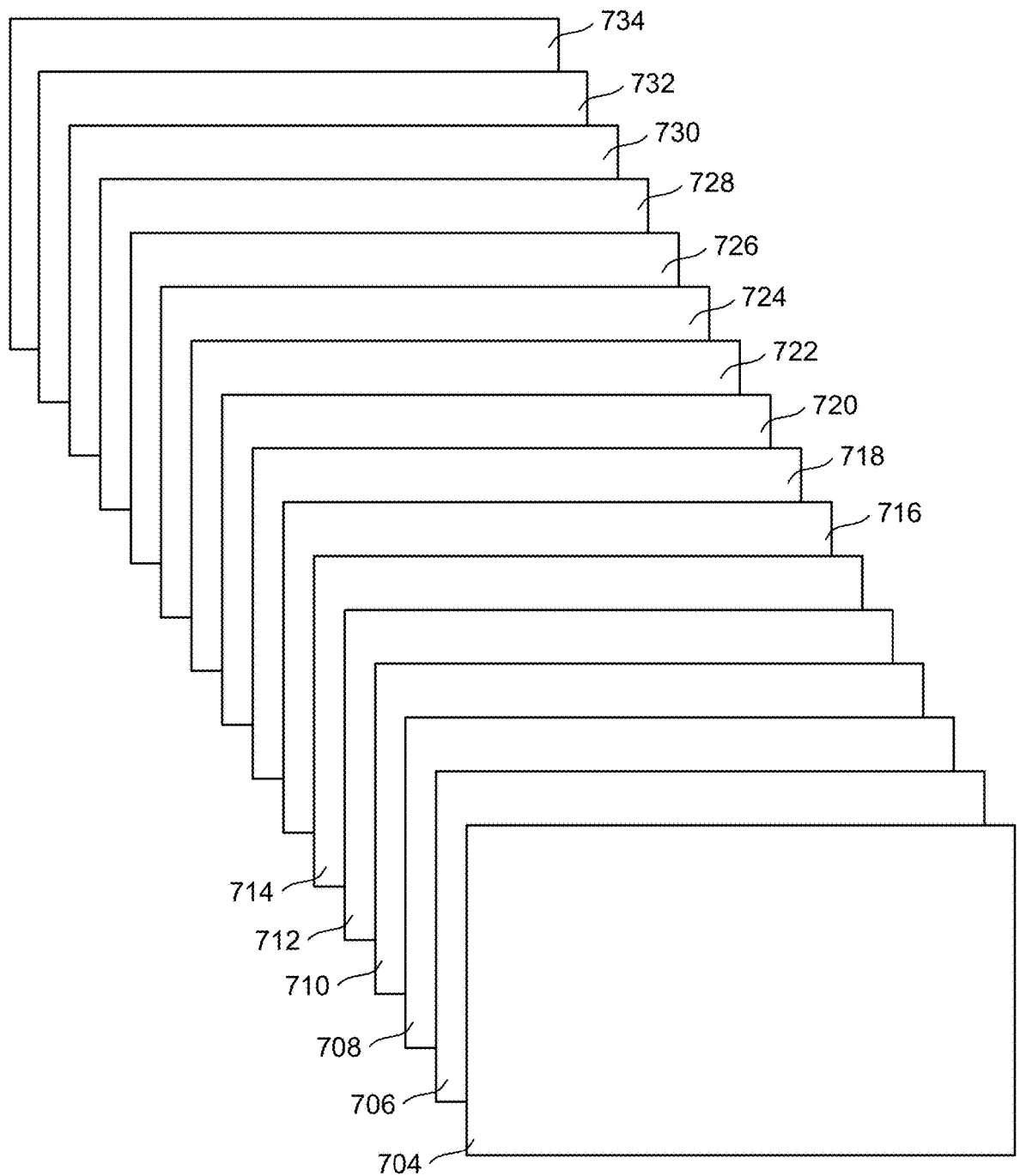
FIG. 7 depicts the various bands of an image captured by a satellite imaging system.

In one embodiment, the sensors described above sense image data in the sixteen bands of FIG. 6 which combine to form a composite image. This concept is depicted in FIG. 7 which illustrates the sixteen bands 704, 706, 708, 710, 712, 714, 716, 718, 720, 722, 724, 726, 728, 730, 732 and 734 that form the composite multispectral image. Each of the bands 704-734 can be referred to as a sub-image or an image as they do comprise image data within the respective range of wavelengths for a plurality of pixels. That is, in one embodiment, each band includes an array of pixels.

FIG. 8 is a graph of reflectance versus wavelength for an example material (e.g., a green tarp). The graph of FIG. 8 is referred to as a spectral profile for a material. The image sensors on satellite 100 discussed above measure reflectance (or radiance), which is the light energy received at the sensor. Curve 802 is referred to as the hyperspectral laboratory spectrum for the material being graphed. That is, at ideal conditions in a laboratory a light source is directed at the material and a sensor senses reflectance. That sensed data is graphed as curve 802. FIG. 8 also shows curve 804, which is the reflectance data from the sensors on satellite 100 (or other airborne craft). As discussed above, the MS1 and MS2 sensors (304/306) sense data in sixteen bands; therefore, curve 804 has sixteen data points (one for each band). The data of curve 804 differs from the data for curve 802 due to atmospheric conditions and, possibly, other factors such as wear, viewing and illumination angles, etc. For example, water vapor (or moisture) in the atmosphere can cause the difference between curves 802 and 804. As depicted in FIG. 8, curves 802 and 804 are offset from each other in the y axis (reflection) direction to make the two curves easier to see, but in reality curve 804 should be drawn slightly higher (in the y axis direction) so that some portions of the curves 802 and 804 may overlap.

FIG. 9 is a flow chart describing one embodiment of a process for operating image collection and distribution system 200 to implement various embodiments of the technology proposed herein. In step 902 of FIG. 9, satellite 100 senses (captures) one or more multispectral spacecraft images from multiple push broom sensors (or other types of sensors) at different positions on the focal plane of the satellite (or other airborne craft), with each sensor comprising multiple bands. In one embodiment, satellite 100 senses multispectral spacecraft images continuously. In other embodiments, satellite 100 senses multispectral spacecraft images according to a schedule or on demand. The sensed images each depict a portion of the surface of Earth or other body (e.g., see FIGS. 4 and 5B). The images are transmitted to ground station 212 and stored in data storage 218. Subsequently, the images are transmitted to image processing system 236 of data center 232 for analysis (steps 904-910). Image processing system 236 performs steps 904-910 for each image (or for a subset of images).

In step 904, image processing system 236 geographically aligns the bands of an image and crops the images to a common extent. As discussed above, in one embodiment an image has sixteen bands so step 904 includes aligning the sixteen bands and cropping so the resulting sixteen bands all depict the same portion of Earth (or other body). In step 906, image processing system 236 preprocesses the images to remove noise and other artifacts. More details of the preprocessing are described below with respect to FIG. 10. In step 908, image processing system 236 detects one or more specific materials in an image according to the technology proposed herein. In step 910, image processing system 236 identifies the detected specific material in the images to create a separate output mask for each image. The output mask can be in the form of an image (e.g., a set of pixels) that shows where in the image the specific material was found. The output mask can also be generated as a set of one or more mathematical formulas, a list of pixel locations or other form that is sufficient to identify where in the multispectral image the material was found. Another embodiment of an output mask is a vector layer (lines or polygons) outlining where the feature was found.

FIG. 10 is a flow chart describing one embodiment of a process for pre-processing an image. That is, FIG. 10 provides more details of step 906 of FIG. 9. Step 1002 of FIG. 10 includes performing topographic correction. In one embodiment, the satellite is not orbiting in a perfect North-South orbit; therefore, the layout of the pixels in all (or a subset) of the bands are rotated to make the image in North-South alignment. Step 1004 includes adjusting for atmospheric conditions. One embodiment includes removing some effects of the atmosphere from the image so that step 1004 is a normalizing step to allow all of the images to be similarly affected by atmospheric effects (e.g., aerosols and water vapor). One example of adjusting for atmospheric conditions is described in U.S. Pat. No. 9,396,528, incorporated herein by reference in its entirety. In one example, step 1004 includes mitigating the effects of water vapor in an atmosphere captured by the multispectral image. Step 1006 includes detecting water, clouds, cloud shadows and other predetermined classes that will be used to identify true negatives and prevent false positives in some embodiments of step 908. In step 1008, the VNIR bands are aligned with the SWIR bands. In one embodiment, the sensor that capture the VNIR bands have greater resolution than the sensors that capture SWIR bands. Therefore, in step 1010, the SWIR bands are re-gridded (e.g., resampled) to adjust the resolution of the SWIR bands to match the resolution of the VNIR bands.

Figure 11:
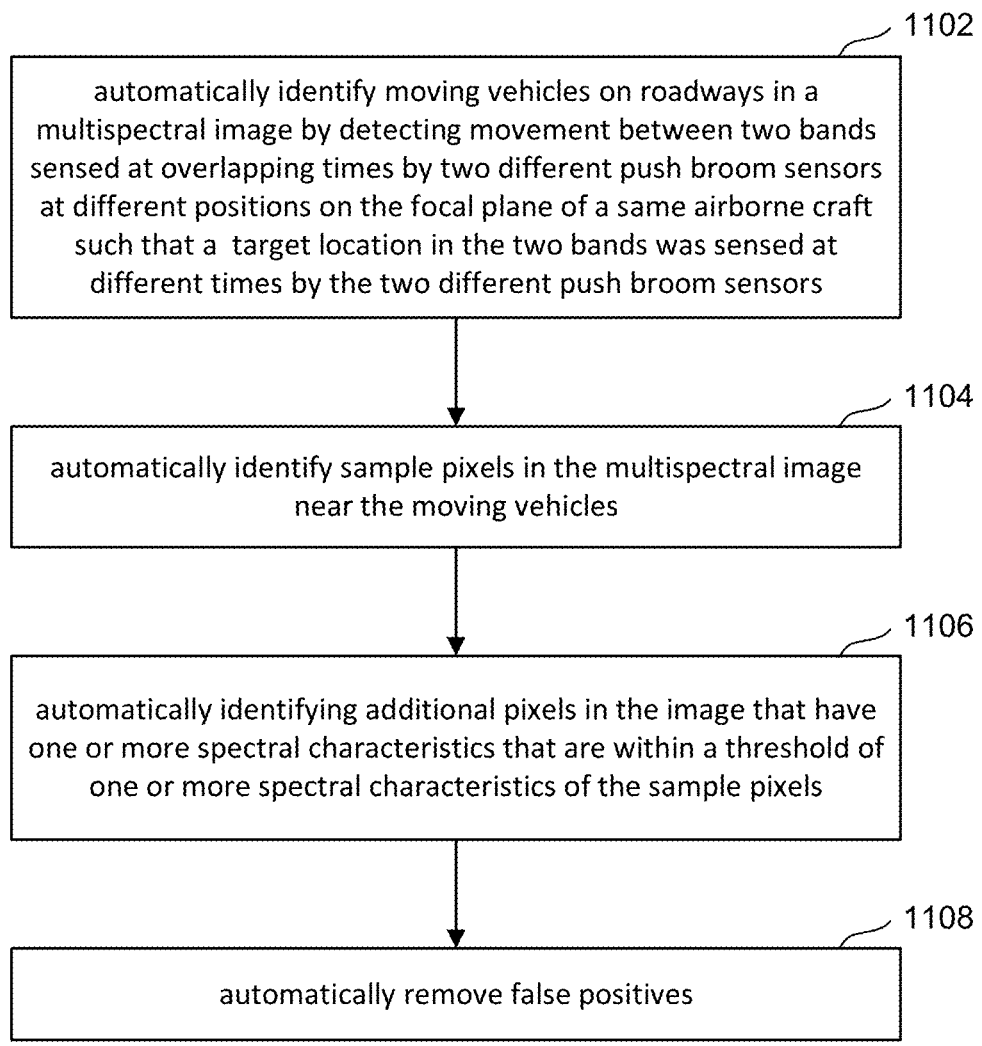
FIG. 11 is a flow chart describing one embodiment of a process for detecting concrete and/or asphalt.

Step 908 of FIG. 9 includes detecting one or more specific materials in an image according to the technology proposed herein. Examples of materials that can be detected are concrete, asphalt, paint, polymer, metal, snow, ice, vegetation, burned terrain, oil slick, etc. Other materials can also be detected. FIG. 11 is a flow chart describing one embodiment of a process for detecting concrete and/or asphalt. The process of FIG. 11 is one example implementation of step 908 or a portion of step 908. The process of FIG. 11 can also be used to detect other materials.

Pavement for roads is made from concrete and/or asphalt. Other structures, including building, roofs, parking lots, etc. can also be made from concrete and/or asphalt. In a clean image free of noise and processing artifacts, concrete and asphalt would have spectral signatures similar to laboratory spectra (i.e., similar to curve 804 of FIG. 8). However, it has been observed that the spectral properties of concrete and asphalt have tremendous variability because different regions use different formulas, different regions have different local materials, aging, weathering, wear due to rubber tires, dirt, different paints and sealants, etc. Hence, it is difficult to develop a generic detector of concrete and/or asphalt for all imagery across the world. To resolve these challenges, the process of FIG. 11 takes advantage of the two sensors MS1 and MS2 being at different positions on the focal plane so that they will image the same location on Earth at different times. In summary, the system looks for moving vehicles to identify the location of roadways/pavement, which are typically made of concrete/asphalt. The system then samples the known concrete/asphalt to obtain a spectral signature for the locale and uses that local spectral signature to find additional concrete/asphalt in the same image. The system is able to detect movement in the image (the moving vehicles) due to the two sensors MS1 and MS2 being at different positions on the focal plane so that they will image the same location on Earth at different times, as described herein.

In step 1102 of FIG. 11, image processing system 236 automatically (without human intervention) identifies moving vehicles on roadways in a multispectral image by detecting movement between two bands sensed at overlapping times by two different push broom sensors at different positions on the focal plane of a same airborne craft such that a target location in the two bands was sensed at different times by the two different push broom sensors. In one embodiment, the two bands used include one band from the MS1 sensor and one band from the MS2 sensor. It is preferable (but not required) to use two bands that are somewhat close in wavelength. In some embodiments, adjacent bands are used. For example, yellow (Y) and red (R) bands can be used (see FIG. 6). Other adjacent bands can also be used.

In step 1104, image processing system 236 automatically identifies sample pixels in the multispectral image near the moving vehicles. In step 1106, image processing system 236 automatically identifies additional pixels in the image that have one or more spectral characteristics (e.g., the spectral profile of curve 804 in FIG. 8) that are within a threshold of one or more spectral characteristics of the sample pixels. In one embodiment, image processing system 236 compares reflectance for eight bands of the multispectral image. More or less than eight bands can also be used. In step 1108, image processing system 236 automatically removes false positives. The sample pixels of step 1104 and the additional pixels identified in step 1106 that are not removed as false positives are pixels that represent concrete and/or asphalt. In one embodiment, step 1108 is optional.

Figure 12A:
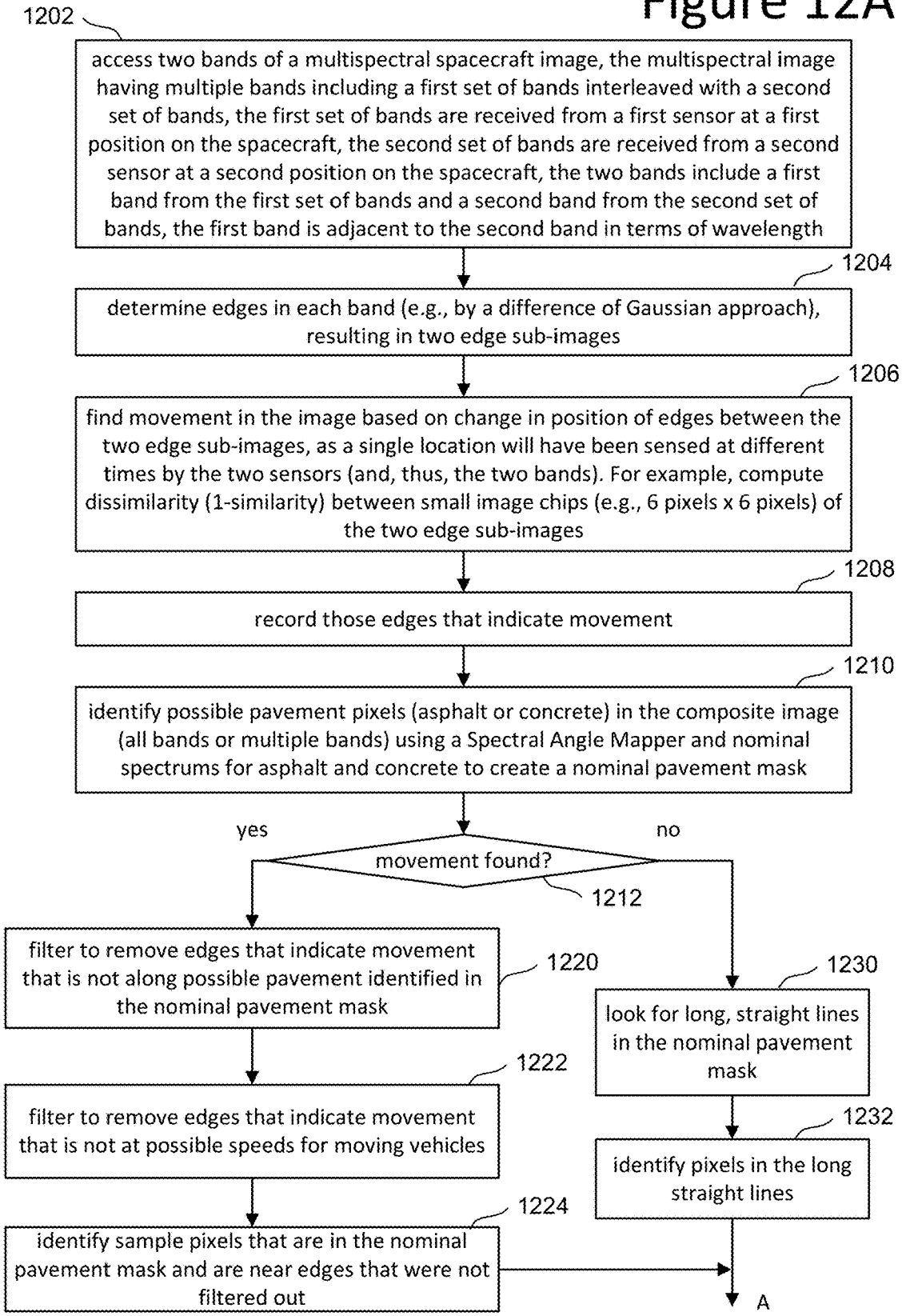

FIGS. 12A and 12B together are a flow chart describing one embodiment of a process for detecting concrete and/or asphalt. The process of FIGS. 12A and 12B provides a more detailed implementation of the process of FIG. 11. Additionally, the process of FIGS. 12A and 12B is one example implementation of step 908 or a portion of step 908. In one embodiment, the process of FIGS. 12A/B is performed by image processing system 236 or another computing apparatus.

In step 1202 of FIG. 12A, the system accesses two bands (e.g., yellow and red) of a multispectral spacecraft image (e.g., image taken from a spacecraft). The multispectral image has multiple bands (e.g., 16, as discussed above) including a first set of bands interleaved with a second set of bands. By interleaved, it is meant that bands of the first set are between bands of the second set. The first set of bands are received from a first sensor (e.g., MS1) at a first position on the spacecraft. The second set of bands are received from a second sensor (e.g., MS2) at a second position on the spacecraft, as described above. The two bands include a first band (e.g., yellow) from the first set of bands and a second band (e.g., red) from the second set of bands. The first band is adjacent to the second band in terms of wavelength (see FIG. 6).

In step 1204, the system determines edges in both of the bands accessed in step 1202 (e.g., yellow and red). One embodiment of step 1204 uses a Difference of Gaussians approach to find edges in the images. Other embodiments use other algorithms, such as (for example) a Canny edge detection algorithm, a Haralick-Canny edge detection algorithm, a Sobel edge detection algorithm, a Prewitt edge detection algorithm, or a Roberts edge detection algorithm. The result of step 1204 is the creation of two edge sub-images, one for each band. Each edge sub-image indicates where edges are located in the respective band.

In step 1206, the system finds movement in the composite image based on changes in the position of edges between the two edge sub-images, as a single location will have been sensed at different times by the two sensors (and, thus, the two bands). For example, the system can compute dissimilarity (1-similarity) between small image chips (e.g., 6 pixels×6 pixels or 16 pixels×16 pixels or other size) of the two edge sub-images. Assume, for example, that the two edge sub-images each includes data for a matrix of 1024× 2048 pixels, and that each of the image chips includes data for 6×6 pixels. Dissimilarity values can be computed, for example, by first computing similarity values for corresponding image chips within the first and second image data. Such similarity values can be in the range of −1 to +1, where the maximum value of 1 corresponds to being most similar (i.e., identical), and the minimum value of −1 corresponds to being least similar (i.e., totally opposite, aka anti-correlated). The dissimilarity values can be computed by subtracting each of the similarity values from 1 to produce the dissimilarity values, where the maximum value of 2 corresponds to being most dissimilar (i.e., totally opposite, aka anti-correlated), and the minimum value of 0 corresponds to being the least dissimilar (i.e., identical). For example, if a similarity value is −1, and that similarity value is subtracted from 1, then the dissimilarity value will be 2 (because 1−(−1)=1+1=2). For another example, if a similarity value is +1, that similarity value is subtracted from 1, then the dissimilarity value will be 0 (because 1−1=0). Accordingly, the maximum dissimilarity value would theoretically be 2, and the minimum dissimilarity value would theoretically be 0. In actual practice, the maximum dissimilarity value is typically less than 2, e.g., about a value of 1.3, but not limited thereto. Further, in actual practice, the minimum dissimilarity value is typically greater than 0. Image chips are sometimes referred to by other names, such as image tiles, or image patches, but not limited thereto.

In step 1208, the system records those edges that indicate movement (e.g., because the edge is at different positions in two bands). In step 1210, the system identifies possible pavement pixels (asphalt and/or concrete) in the composite image (all bands or multiple bands) using a Spectral Angle Mapper and nominal spectrums for asphalt and concrete (e.g., nominal spectral characteristics of roads) to create a nominal pavement mask that identifies pixels that are pavement (concrete and/or asphalt). The nominal spectrums for asphalt and concrete can include one or more hyperspectral laboratory spectrums (e.g., see curve 802 of FIG. 8) for one or more variations of asphalt and concrete. A Spectral Angle Mapper (SAM) is just one example process to identify similar spectra. Other spectral matching techniques includes (but are not limited to) Euclidean Distance Measure (ED), Spectral Correlation Angle (SCA), and Adaptive Coherence Estimator (ACE).

For those images where step 1206 found movement (step 1212), then the system filters to remove those edges that indicate movement that is not along (e.g., in or adjacent) possible pavement identified in the nominal pavement mask (see step 1210). For example, if the object represented by the edge is not moving along pavement (concrete and/or asphalt), then the object in the image is probably not a car or truck (or other vehicle). In step 1222, the system filters to remove those edges that indicate movement that is at speeds not possible for moving vehicles. For example, cars and trucks will move within a certain range of speeds, so if the edge has moved farther than an expected range, then the system concludes that the edge does not represent a car or truck. Steps 1202-1222 of FIG. 12A correspond to step 1102 of FIG. 11.

In step 1224, the system identifies sample pixels that are in the nominal pavement mask and are near edges that represent movement that were not filtered out in steps 1220 and 1222. These sample pixels are on roads and represent an example of local concrete and/or asphalt. Step 1224 of FIG. 12A corresponds to step 1104 of FIG. 11.

For those images where step 1206 did not find edges indicating movement (step 1212), then the system looks for long straight lines of pavement in the nominal pavement mask (step 1230). In step 1232, sample pixels are identified along the long straight lines of pavement in the nominal pavement mask. After step 1224 or step 1232, the process continues at step 1250 of FIG. 12B (see A).

In step 1250 of FIG. 12B, the system determines one or more spectral characteristics for the sample pixels that were identified in step 1224 or 1232. In one embodiment, the system computes chroma and lightness in the HSL (hue, saturation, lightness) model using identified pixels near the moving vehicles on pavement, using only the RGB bands of the image. In step 1252, the system clusters the 8- or 16-band spectra (using k-means clustering) and then computes average chroma and lightness for each cluster and an average spectrum for each cluster (a vector that includes a single value for each band). In step 1254, the system identifies additional pixels that may be pavement. For each cluster the system identifies pixels that are within a threshold angle of the average spectrum for that cluster (e.g., using the Spectral Angle Mapper) and have chroma and lightness values within a predetermined range of the average chroma and lightness values for that cluster. These additional pixels are potential concrete or asphalt. Steps 1250-1254 of FIG. 12B correspond to step 1106 of FIG. 11. Note that in other embodiments, step 1250-1254 can use bands in addition to or instead of RGB bands.

Steps 1256-1262 of FIG. 12A are performed to remove false positives and correspond to step 1108 of FIG. 11. In step 1256, the system uses the normalized difference vegetation index (NDVI) to identify vegetation and remove any pixels determined to be vegetation that were previously identified to be potential asphalt and concrete. In step 1258, the system compares remaining pixels identified to be potential asphalt and concrete (using the composite image) to nominal pre-stored spectral profile for sand and soil using a Spectral Angle Mapper and removes any pixels within a predetermined matching threshold angle of sand and/or soil. In step 1260, the system uses the dynamic classifier (discussed in more detail below with respect to FIG. 16) to better distinguish sand/soil from concrete/asphalt in order to further eliminate false positives that are more likely to be sand/soil. In step 1262, the system removes false positives of the additional pixels for pixels that represent a plastic polymer by computing and thresholding one or more spectral band indices (i.e., band ratios). In one example, the system computes a first ratio of spectra values for two bands and a second ratio of spectra values for two other bands, adds the first ratio to the second ratio to create a sum and compares the sum to a threshold, such that pixels with a sum greater than the threshold represent plastic polymer and are removed from the additional pixels. In some embodiments, any one or more of steps 1256-1262 are optional.

Figure 13B:
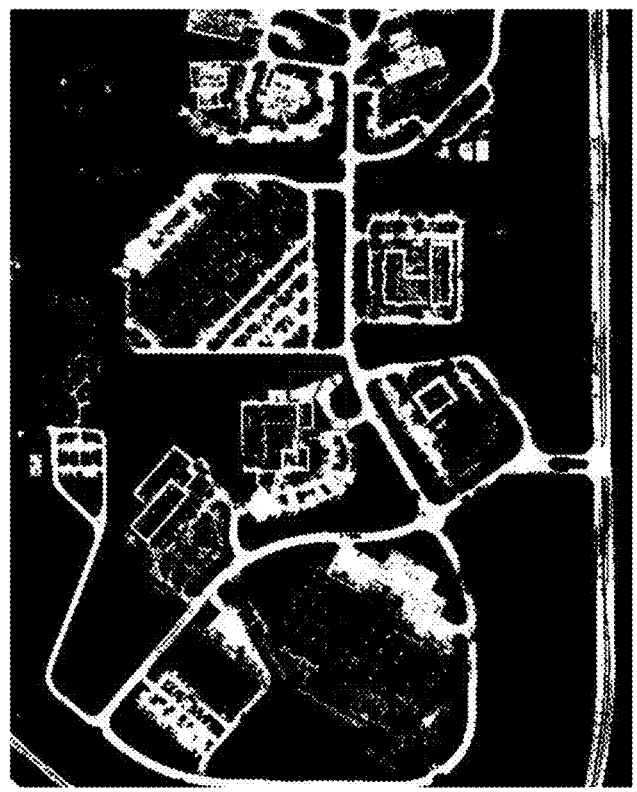
FIG. 13B is an example of an output mask that identifies concrete and/or asphalt.
Figure 13A:
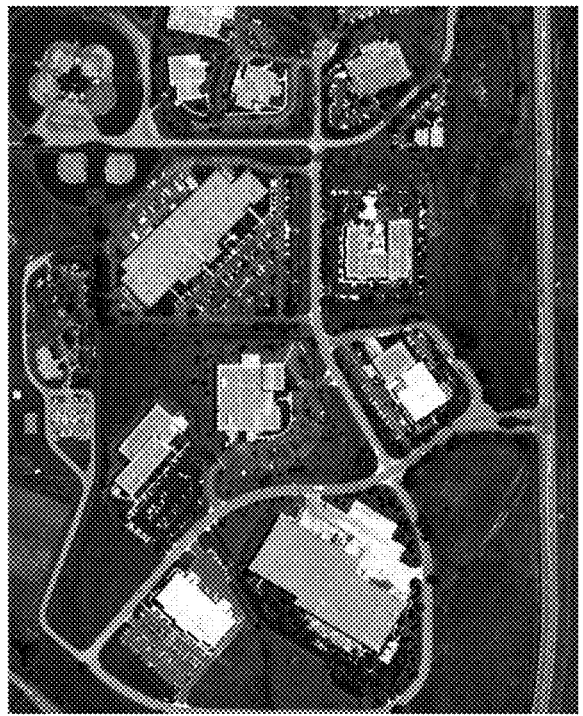
FIG. 13A is an example of a multispectral image taken from an airborne craft.

FIG. 13A is an example of a multispectral image taken from an airborne craft (e.g., a multispectral spacecraft image taken from a satellite orbiting the Earth). FIG. 13B is an example of an output mask that identifies pixels in the image of FIG. 13A that represent (i.e. depict) concrete and/or asphalt. White portions of FIG. 13B indicate concrete and/or asphalt in the corresponding portion of the image of FIG. 13A. Black portions of FIG. 13B indicate no detected concrete and/or asphalt in the corresponding portion of the image of FIG. 13A. FIG. 13B represents the output of the process of FIG. 11 or the process of FIGS. 12A/B. Thus, the output mask of FIG. 13B is generated during step 910 of FIG. 9.

As mentioned above, one embodiment of the proposed technology includes using machine learning technology in the form of a dynamic classifier that is developed by training a classification model on automatically labeled data from the same image to which the trained classifier is subsequently applied. In one embodiment, the data is automatically labeled using a first non-adaptive classifier. The dynamic classifier can be used to identify many types of materials in a multispectral image taken by a satellite or other airborne craft, including (but not limited to) those materials mentioned above.

In general, a classifier can be thought of as a labeled partition of a k-dimensional space. A classifier assigns any query point in the feature space to the label of its partition. A classifier is sometimes constructed as a custom (ad hoc) abstract algorithm involving fixed formulas and parameters. Sometime classifiers yield better results when constructed as specialty tuned instances of a standard geometric paradigm.

Figure 14:
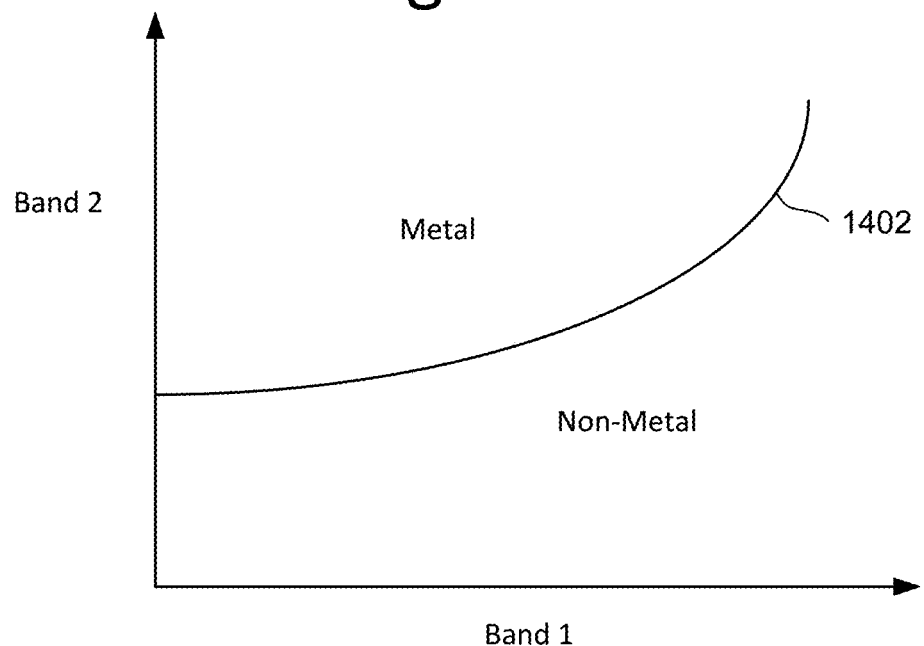
FIG. 14 is a graph that explains the operation of a classifier.

A spectral classifier that operates on the pixels of 8 VNIR bands of an image is effectively a labeled partition of an 8-dimensional space. In some embodiments the partition only consists of two parts: feature or no feature. In one example, the partition only consists of two parts: metal or no metal. Other embodiments may include a partition with more than two parts. FIG. 14 is a graph that depicts the operation of a trained classifier for an example that operates on two bands and the partition only consists of two parts: metal or no metal. Curve 1402 separates the feature space to be either metal (above curve 402) or non-metal (below curve 402). Each data point is a pixel in the two bands. FIG. 14 shows the band combinations that correspond to an assignment of metal or non-metal to any query point in the feature space.

Figure 15:
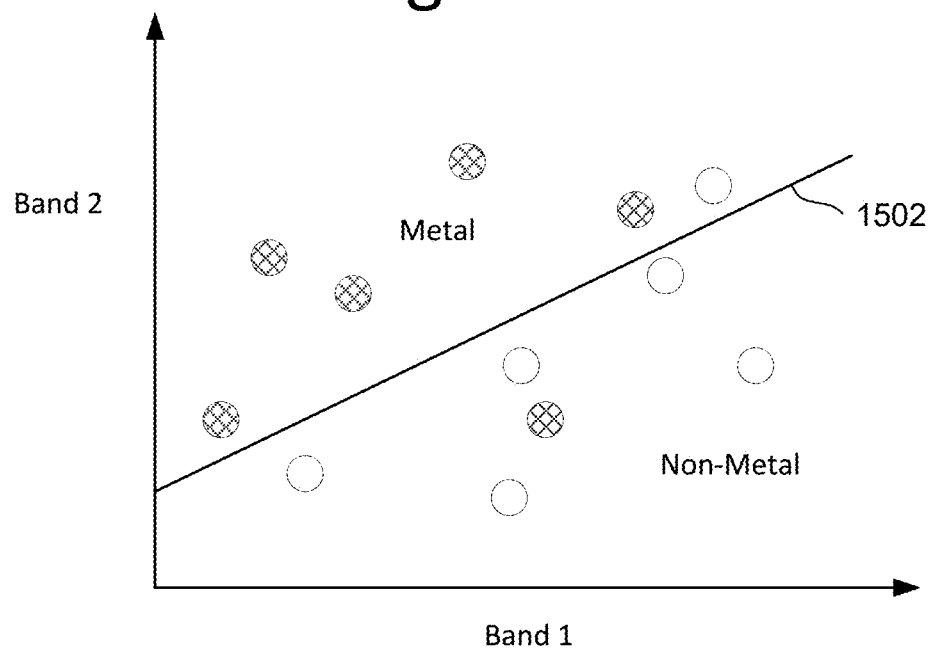
FIG. 15 is a graph that explains the training of a linear classification model when performing machine learning.

Classifiers are often built from classification models. In general, a classification model describes the allowable kinds of surfaces that partition the feature space and describe the algorithm by which the particular surfaces are obtained from a finite training set. For example, a linear binary classifier (LBC) model divides the feature space into two parts using a line or a plane. The LBC constructs the line or plane from a supplied finite training set of labeled points in the space. Different LBC models construct the dividing plane/line in different ways. FIG. 15 is a graph that provides one example of a LBC classification model for an example that operates on two bands and the partition only consists of two parts: metal or no metal. The labeled training points depicted in FIG. 15 were supplied as input. Those circles that are shaded are training points labeled as metal. Those circles that are not shaded are training points labeled as non-metal. The LBC classification model is equipped with an algorithm that computes the best planar division of the space (line 1502), as consistent as possible with the labeled training set. The resulting division of the space (training the classification model) is the trained classifier. As depicted in FIG. 15, the trained classifier is not always perfect, as the partition depicted in FIG. 15 has some errors. For example, there is a metal data point below line 1502 and a non-metal data point above line 1502. A goal of training the classification model is to minimize errors on the training data set.

The dividing surfaces of the classification model can be planes, quadratics or other shapes. The technology disclosed herein does not require any particular shape for the divider. The classification model need not be binary. Rather, the classification model may partition the space into two, three, four or more parts. Different well-known classification models can be used, including Linear Discriminant Analysis ("LDA"), Quadratic Discriminant Analysis ("QDA"), Linear Support Vector Machines ("SVM"), Radial Basis Function SVM, Gaussian Process, Decision Tree, Random Forest, AdaBoost, Naïve Bayes, and others. Thus, the technology disclosed herein can make use of any suitable classification model and train the classification model to become a trained classifier to classify one or more materials.

It is proposed to use a trained classifier to identify whether and where a multispectral image depicts a particular material (or multiple materials). For example, given a 16-band image (or another number of bands) as described above, and a collection of class labels (e.g., two or more classes), assign each pixel one of the labels. One example is to assign each pixel in an image as concrete/asphalt or not concrete/asphalt. Another example is to assign each pixel as paint or not paint. Other materials that can be tested for include (but are not limited to) polymers, water, ice, snow, vegetation, deciduous forest, burned terrain, algal bloom, oil, etc. The technology proposed herein is not limited to any particular material.

Previous attempts to identify materials or items in an image have used non-adaptive, fixed, universal algorithms. However, these algorithms do not work well for many materials. As mentioned above, some materials like concrete and asphalt vary, as discussed above. Other materials may change over time in ways that are expected and unexpected. Therefore, a dynamic classifier is proposed such that a classification model is trained automatically on a per image basis. Thus, a two step approach is proposed. First, in one embodiment, one or more universal algorithms are developed that involve a number of fixed formulas, fixed parameters and (possibly) other ancillary data (e.g., global land cover map), such that when applied to any input image it can identify a subset of pixels in that image that represent instances of the material being investigated (and/or non-instances of the material being investigated) and correctly classify (label) pixels with a high degree of confidence. The labeled pixels in the above-mentioned subset are then used to train a classification model. This produces a trained classifier specifically tuned to the unique characteristics of the current image, which is then used to classify all or a subset of the pixels in that image. Thus, a new classifier is built in a fully automated manner for every image.

Figure 16:
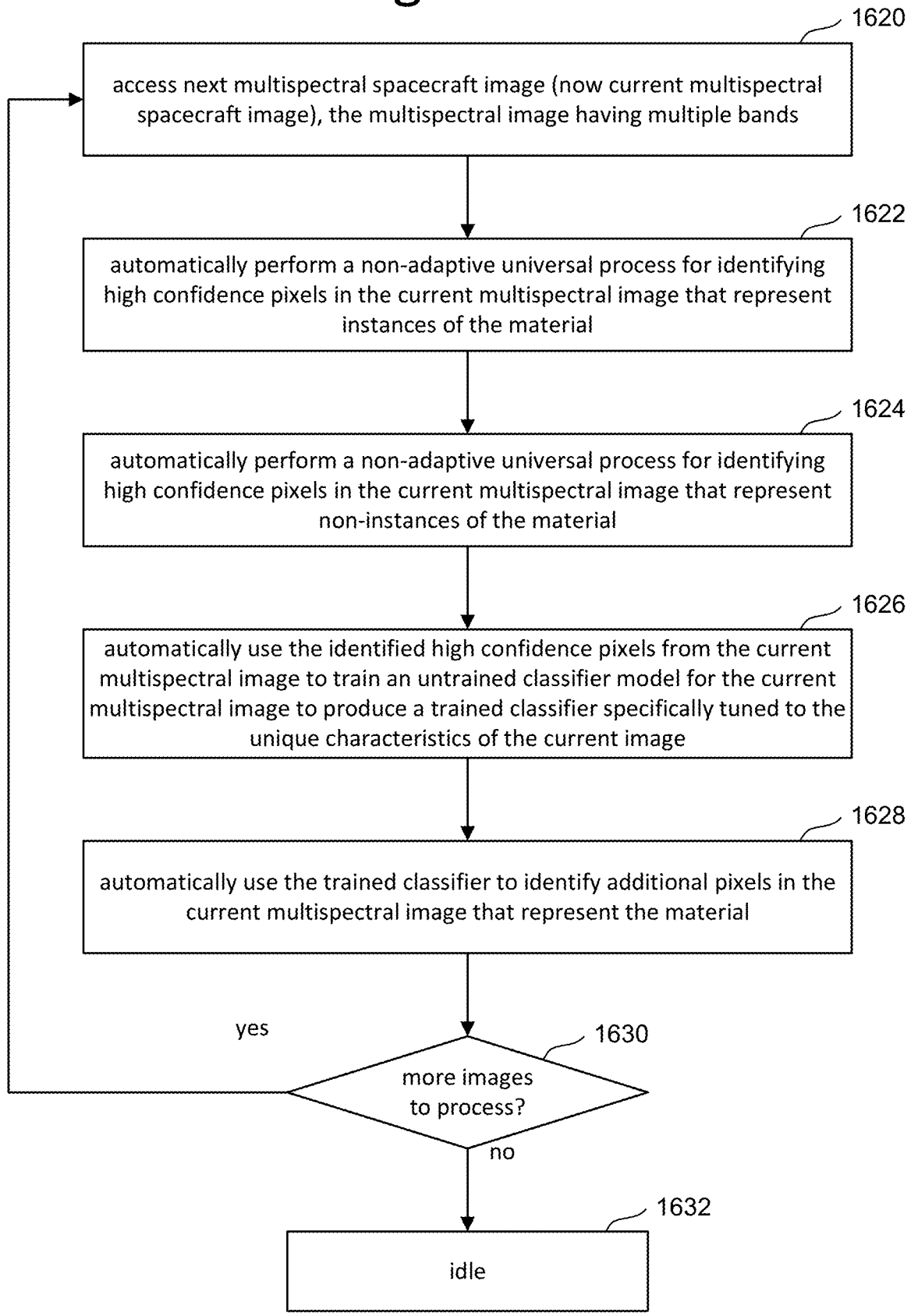
FIG. 16 is a flow chart describing one embodiment of a process for detecting a one or more materials in an image by using a dynamic classifier that is the result of training a classification model using data from the same image to which the trained classifier is subsequently applied.

FIG. 16 is a flow chart describing one embodiment of a process for detecting one or more materials in an image by using a dynamic classifier that is the result of training the classification model with data from the same image to which the trained classifier is subsequently applied. The process of FIG. 16 is one example implementation of step 908 of FIG. 9. In one embodiment, the process of FIG. 16 is fully automated (no human intervention needed) and is performed by image processing system 236.

In step 1620 of FIG. 16, the system accesses a next multispectral spacecraft image (now referred to as the current multispectral spacecraft image). This multispectral image has multiple bands, as explained above. In step 1622, the system automatically performs a non-adaptive universal process for identifying high confidence pixels in the current multispectral image that represent instances of a material. One example implementation of step 1622 is to use a spectral angle mapper with a small angular threshold to compare the hyperspectral laboratory spectrum (see e.g., curve 802 of FIG. 8) for a material in order to obtain high confidence samples. Pixels with spectral data within the small angular threshold represent instances of the material. Another embodiment of step 1622 is to perform the processes of FIG. 11 or the process of FIGS. 12A/12B. While some embodiments of step 1622 use spectral characteristics to classify pixels, other embodiments of step 1622 use characteristics other than spectral characteristics to classify pixels; for example, movement and/or morphological considerations like size, shape and/or texture can be used to classify pixels. In some embodiments, step 1622 is performed using multiple detection modalities. A priori information such as from global landcover maps or historical databases can also be used. The result of step 1622 is a first set of pixels in the current multispectral spacecraft image that represent instances of the material.

In step 1624, the system automatically performs a non-adaptive universal process for identifying high confidence pixels in the current multispectral image that represent non-instances of the material. For example, if step 1622 identifies pixels representing metal, then step 1624 identifies pixels representing non-metal. One example implementation of step 1624 is to use a spectral angle mapper with a large angular threshold to compare the hyperspectral laboratory spectrum (see e.g., curve 802 of FIG. 8) for a material in order to obtain high confidence samples. Pixels with spectral data that exceed the large angular threshold represent non-instances of the material. Other techniques known in the art can also be used to identify non-instances of a materiel with high confidence. For example, using known techniques (e.g., band indices, morphological analysis) to identify other materials (e.g., vegetation) can be used to obtain high confidence pixels that represent non-instances of the material (e.g., metal). The result of step 1624 is a second set of pixels in the current multispectral spacecraft image that represent non-instances of the material. In some embodiments, the process of FIG. 16 includes performing steps 1622, 1626 and 1628 without performing step 1624 (e.g., step 1624 is optional). In one embodiment, the process performed in step 1622 and the process performed in step 1624 are each non-adaptive processes that are performed independently (e.g., run separately) and execute the same algorithm (e.g., spectral angle mapper).

In step 1626, the system automatically uses the identified high confidence pixels from the current multispectral image to train an untrained classification model for the current multispectral image to produce a trained classifier specifically tuned to the unique characteristics of the current image. That is, the system uses the first set of pixels from step 1622 that represent instances of the material and the second set of pixels from step 1624 that represent non-instances of the material to train the classification model. In one embodiment, the step of automatically using identified high confidence pixels to train the classification model (step 1626) comprises creating a trained classifier that has not been trained using data from other images taken from the satellite (or other airborne craft) or any other images.

In step 1628, the system automatically uses the trained classifier to identify additional pixels in the current multispectral image that represent the material. That is, each of the pixels in the current image (other than the first set of pixels from step 1622 and the second set of pixels from step 1624) are fed to the trained classifier and the trained classifier classifies and labels the pixels as depicting the material in question or not depicting the material in question. In one embodiment, the additional pixels in the current multispectral image that represent the material that are identified in step 1628 are lower confidence pixels in that the system has a lower confidence that they represent the material than the pixels identified in step 1622. However, in other embodiments, the pixels identified in step 1628 are high confidence pixels or the system does not discriminate between low confidence and high confidence pixels. In one embodiment, the step of automatically using the trained classifier (step 1628) comprises classifying pixels in the current multispectral spacecraft image based on spectral information in four or more bands in the visible spectrum and two or more bands in the infrared spectrum (e.g., VNIR bands). In other embodiments, other sets of bands can be used.

In one embodiment, the process of step 1628 identifies pixels that represent instances of the material in addition to the first set of pixels from step 1622 and the second set of pixels from step 1624. In another embodiment, all of the pixels of the current multispectral image are classified by the trained classifier in step 1628 such that the process of step 1628 identifies pixels that represent instances of the material and/or non-instances of the material (including the first set of pixels from step 1622 and the second set of pixels from step 1624).

If there are more images to analyze, then the process of FIG. 16 loops back to step 1620 and the next image is accessed. Note that the moving on to the next image may or may not be automated and in some examples there may be multiple images to process or only one image to process. The loop of steps 1620-1630 provides for accessing multiple multispectral images and performing the above steps on each of the accessed images such the classifier is separately trained for each composite image. After all of the images that need to be processed are analyzed, the method of FIG. 16 is complete and the system is idle (step 1632). In one embodiment, after classifying pixels (in step 1628) the system performs post-processing steps (e.g., morphological processing to remove noise) to clean up the result.

Figure 17:
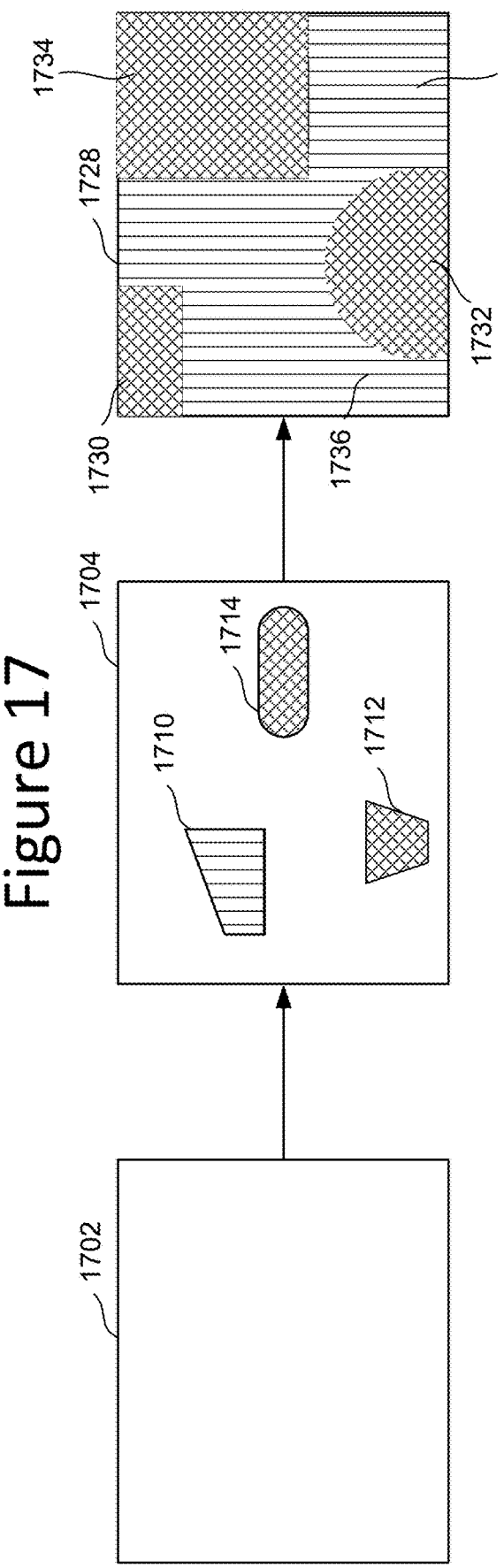
FIG. 17 depicts an example of the operation of FIG. 16.

FIG. 17 depicts an example of the operation of FIG. 16. Image 1702 is an example of a multispectral spacecraft image accessed in step 1620. For example, image 1702 is obtained by satellite 100 using the sensors described above. Image 1704 is an example of the output of steps 1622 and 1624, as it identifies high confidence pixels in the current multispectral image 1702 that represent instances of a material and non-instances of the material. Consider an example of trying to find paint in a multispectral spacecraft image. One example goal would be to classify every pixel in image 1702 as paint (instance of a material) or not paint (non-instance of a material) based on the spectral information in the multiple bands (see FIG. 8). Image 1704 identifies three sets 1710, 1712, 1714 of high confidence pixels. The system determined that sets of pixels 1712 and 1714 represent instances of paint by using a spectral angle mapper to compare the hyperspectral laboratory spectrum for paint to the spectral profile (over eight bands) for the pixels in image 1702. The system may also apply other techniques to confirm the classification and increase its confidence of detection. The system also determined that set of pixels 1710 are not paint (non-instances of paint) by also using the spectral angle mapper to compare the hyperspectral laboratory spectrum for paint to the spectral profile (over 8 bands) for the pixels in image 1702 and determining that the pixels 1710 are too different from paint. Image 1728 is an example of the output of step 1626, as it classifies (and labels) all pixels as paint (1730, 1732 and 1734) or not paint (1736) using the trained classifier.

Figure 18:
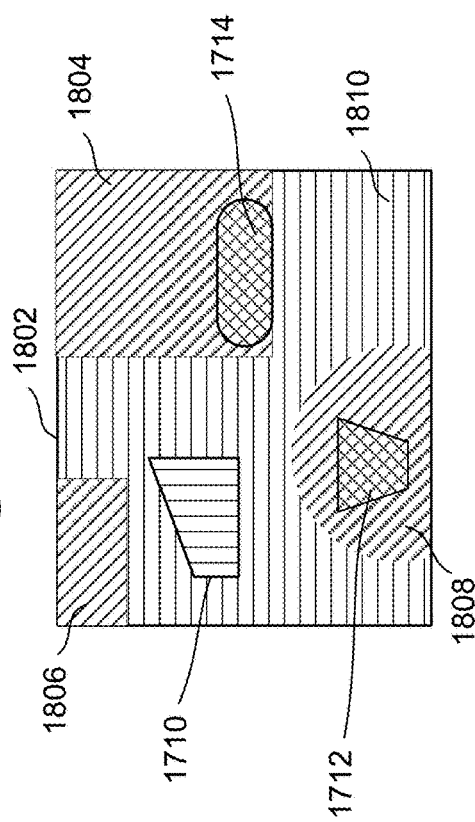
FIG. 18 depicts an example of the operation of FIG. 16.

In the example of FIG. 17, the output (image 1728) groups all of the paint pixels together and groups all of the non-paint pixels together. That is, although the system determined the first set of pixels in step 1622 that represent instances of paint, the second set of pixels in step 1624 that represent non-instances of paint and the additional pixels identified and labeled as paint in step 1628, the output mask does not identify which pixels were identified in steps 1622/1624 and which pixels were identified in step 1628. FIG. 18 depicts another embodiment of an output image (e.g., to replace image 1728) that identifies which pixels were identified in steps 1622/1624 and which pixels were identified in step 1628 For example, image 1802 of FIG. 18 (an example of an output mask) is an example of the output of step 1628 that separately identifies the first set of pixels (1712, 1714) from step 1622 that represent instances of paint, the second set of pixels (1720) from step 1624 that represent non-instances of paint, additional pixels (1804, 1806, 1808) identified in step

1628 that represent instances of paint and additional pixels (1810) identified in step 1628 that represent non-instances of paint.

Figure 19A:
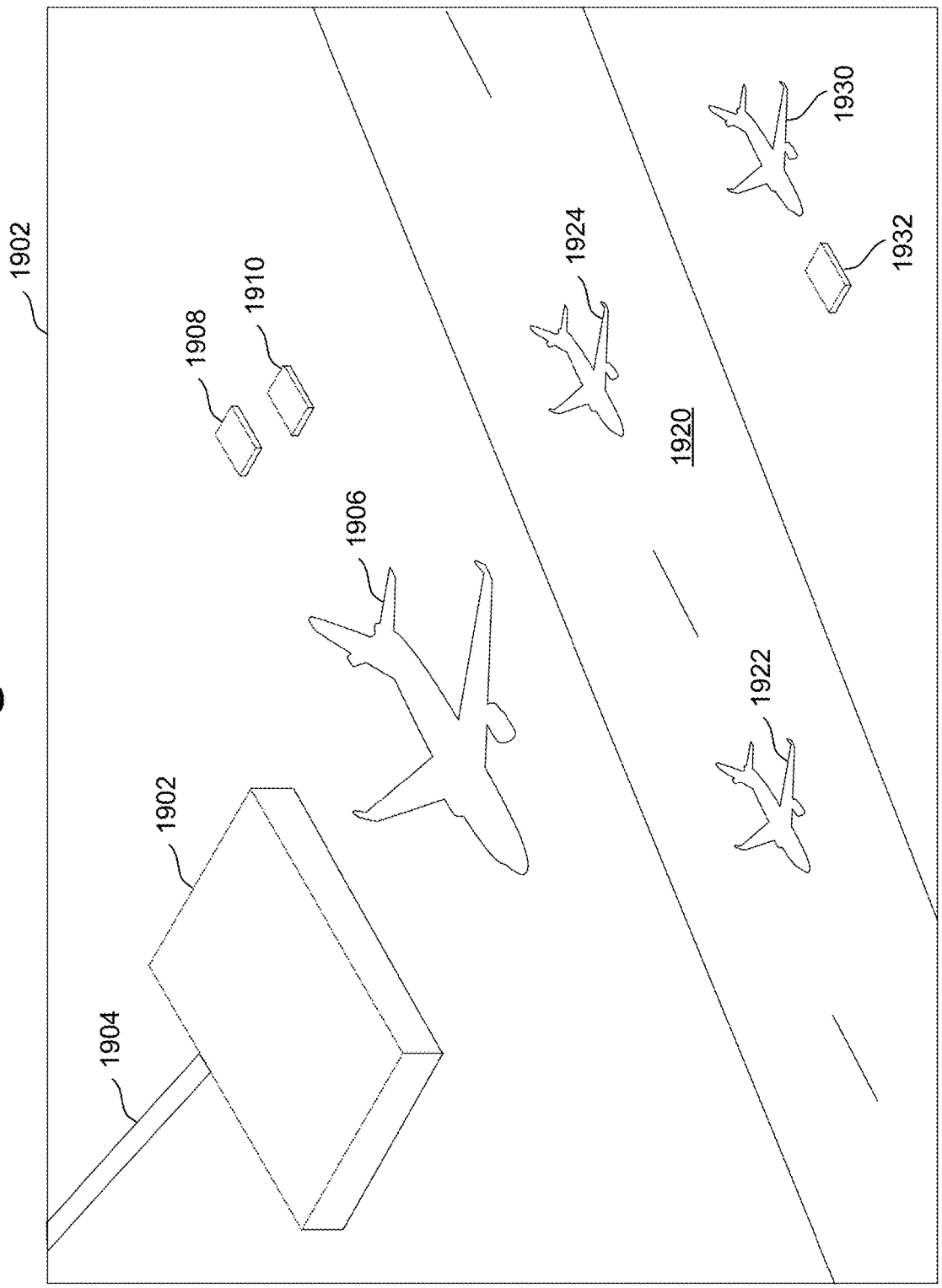
FIGS. 19A-C are images that explain the operation of FIG. 16.
Figure 19B:
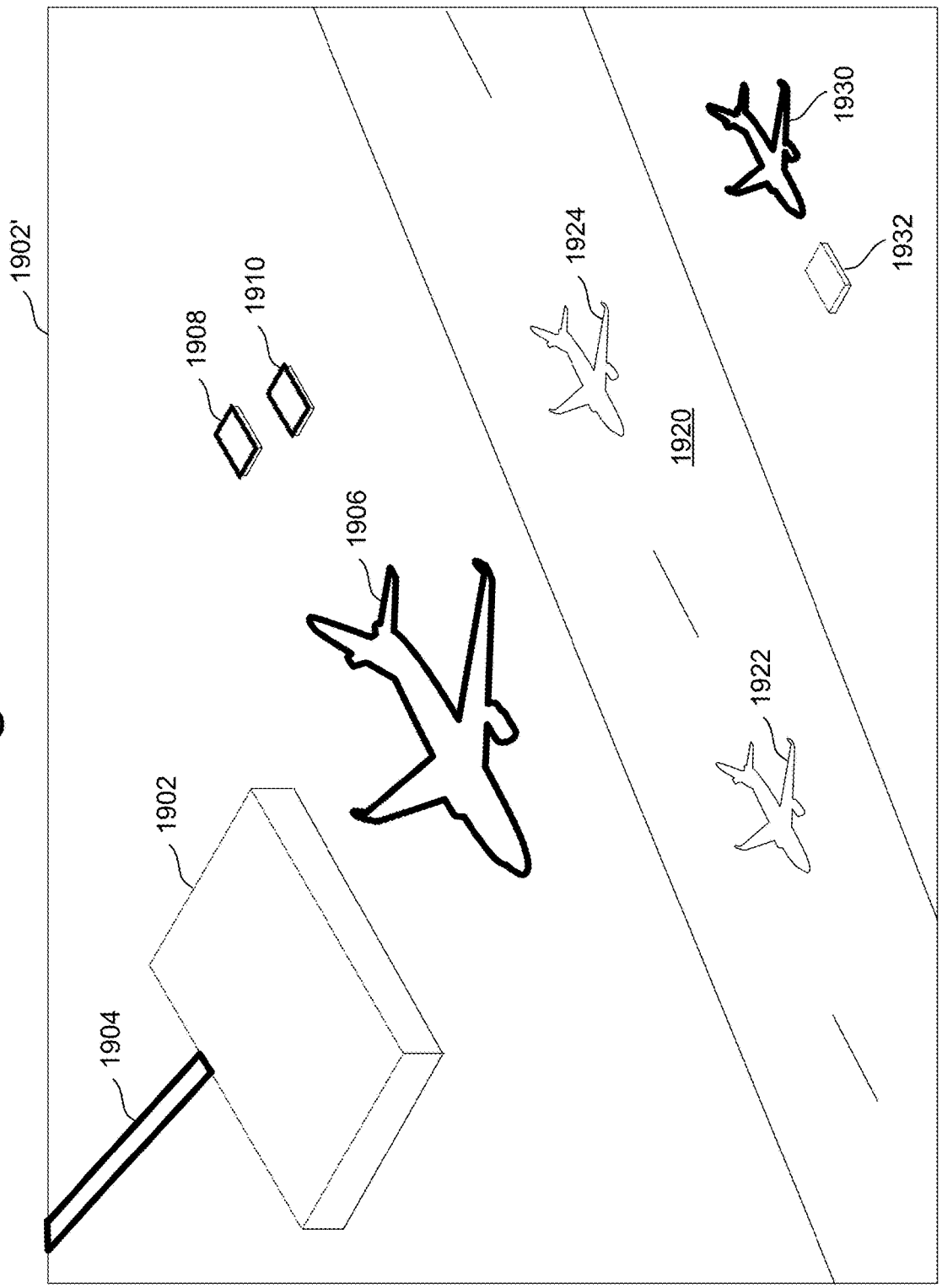
Figure 19C:
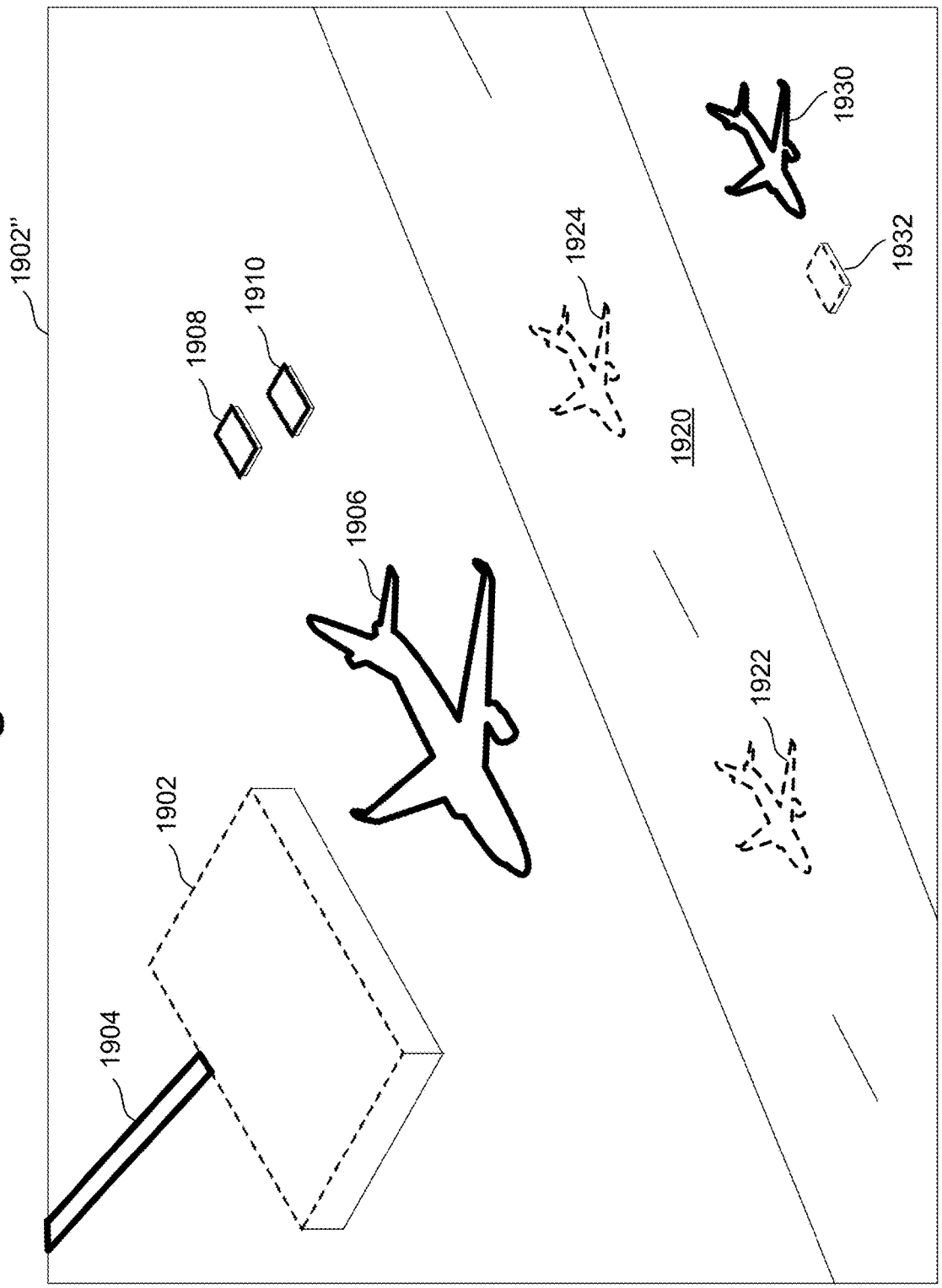

FIGS. 19A-C are additional images that explain the operation of FIG. 16. Image 1902 of FIG. 19A is an example of a multispectral spacecraft image accessed in step 1620. Image 1902 depicts an airport comprising buildings 1902, 1908, 1910 and 1932; and airplanes 1906, 1922 and 1924. A path 1904 is also depicted.

Image 1902' of FIG. 19B is an example of the output of step 1622, as it identifies high confidence pixels in the current multispectral image 1902 that represent instances of a material. Consider the same example of trying to find paint in a multispectral spacecraft image. In the embodiment of FIG. 19B, the system highlights the high confidence pixels using bold lines. For example, path 1904, airplane 1906, the roof of building 1908, the roof of building 1910 and airplane 1930 are all highlighted with bold outlines to indicate that the pixels within the bold outlines are high confidence pixels representing paint. These high confidence pixels representing paint are used to train a classification model in step 1624.

Image 1902" of FIG. 19C is an example of the output of step 1628 (and is another example of an output mask). In this embodiment, image 1902" identifies high confidence paint pixels (from step 1622) with bold outlines (as previously identified in image 1902' of FIG. 19B) and additional pixels (from step 1628) that represent instances of paint with dashed outlines. For example, the roof of building 1902, airplane 1922, airplane 1924 and the roof of building 1932 are additional pixels that represent instances of paint with dashed outlines. The pixels within the dashed outlines are the additional pixels that represent instances of paint as determined by the trained classifier.

In some of the above-described embodiments, the system uses pixels from an image to train an untrained classification model and then uses that trained classifier on the same image. In another embodiment, the system uses pixels from a particular image to perform additional training for a classification model that was previously trained from other images and then uses that additionally trained classifier on the same particular image.

Further note that the images used with the dynamic classifier discussed above need not be sensed from a push broom sensor. Many different types of sensors can be used. In some example implementations, different classification models may be used for different types of sensors.

The above text describes a system for identifying concrete and/or asphalt (or another material) in an image (e.g., an image captured by a satellite or other airborne craft). One embodiment includes a process for identifying a material in an image, comprising: automatically identifying moving vehicles in a multispectral image; automatically identifying sample pixels in the multispectral image that are near the moving vehicles; and automatically identifying additional pixels in the multispectral image that have one or more spectral characteristics that are within a threshold of one or more spectral characteristics of the sample pixels. The identified additional pixels depict the material.

One embodiment includes a process for identifying a material in an image, comprising: accessing two bands of a multispectral image, the two bands are from different sensors at different positions of a focal plane; separately finding edges in the two bands; finding movement in the multispectral image based on change in position of edges between the two bands geographically aligned; identifying possible pavement using nominal spectral characteristics of pavement; filtering to remove edges that indicate movement that is not along possible pavement; filtering to remove edges that indicate movement that is not at possible speeds for moving vehicles; determining one or more spectral characteristics of sample pixels of the possible pavement near edges remaining after the filtering; and automatically identifying additional pixels in the image that have one or more spectral characteristics that are within a threshold of one or more spectral characteristics of the sample pixels, the identified additional pixels depict the material.

One embodiment includes a non-transitory processor readable storage device having processor readable code embodied on the processor read storage device. The processor readable code for programming one or more processors to perform a method. The method comprises accessing two bands of a multispectral spacecraft image, the multispectral image having multiple bands including a first set of bands and a second set of band, the first set of bands are received from a first sensor at a first position on the spacecraft, the second set of bands are received from a second sensor at a second position on the spacecraft, the two bands include a first band from the first set of bands and a second band from the second set of bands, the first band is adjacent to the second band in terms of wavelength; determining edges in the first band using a difference in Gaussian process that results in a first edge sub-image and determining edges in the second band using the difference in Gaussian process that results in a second edge sub-image; finding movement in the multispectral spacecraft image based on determining change in position of edges between the first edge sub-image and the second edge sub-image by computing dissimilarity between small image chips of the first edge sub-image and the second edge to identify a set of edges; identifying possible asphalt or concrete pixels in the multispectral spacecraft image using a spectral angle mapper, nominal spectrums for asphalt and nominal spectrums for concrete to create a nominal pavement mask; first filtering out edges of the set of edges that are not adjacent to possible asphalt or concrete pixels; second filtering out of edges of the set of edges that are not moving at possible speeds for moving vehicles; identifying sample pixels of the multispectral spacecraft image that are in the nominal pavement mask and are near edges of the set of edges that were not filtered out by the first filtering and the second filtering; determining one or more spectral characteristics for sample pixels; and identifying additional pixels in the multispectral spacecraft image that have one or more spectral characteristics that are within a threshold of one or more spectral characteristics of the sample pixels.

The above text describes a system for identifying a material in an image (e.g., an image captured at a satellite or other airborne craft). One embodiment includes a method for identifying a material in an image, comprising accessing a first image; automatically performing a first process to identify a first set of pixels in the first image that represent instances of the material; automatically using the first set of pixels from the first image to train a classification model to create a trained classifier specifically for the first image, the trained classifier being different than the first process; and automatically using the trained classifier to identify additional pixels in the first image that represent the material.

One example implementation further comprises accessing additional images and training the classification model to identify pixels in the additional images that represent the material prior to the automatically using the first set of pixels from the first image to train the classification model. The automatically using the first set of pixels from the first image to train the classification model comprises creating a trained classifier that has not been trained using data from other images of the additional images.

One example implementation further comprises accessing a second image; automatically performing the first process to identify a third set of pixels in the second image that represent the material; after the automatically using the first set of pixels from the first image to train the classification model, automatically using the third set of pixels to train a version of the classification model that has not been trained by the first set of pixels to create a newly trained classifier; and automatically using the newly trained classifier to identify a fourth set of pixels in the second image that represent the material.

One embodiment includes a method for identifying a material in an image comprising accessing multiple multispectral images, each of the multispectral images comprising multiple bands. For each of the multispectral images, the system identifies first pixels in the respective multispectral image that represent instances of the material, uses the first pixels to train a classification model to create a respective trained classifier that has not been trained using data from a previous image of the accessed multiple multispectral images, and uses the respective trained classifier to identify additional pixels in the multispectral image.

One embodiment includes a non-transitory processor readable storage device having processor readable code embodied on the processor read storage device. The processor readable code is for programming one or more processors to perform a method. The method comprises accessing a multispectral image taken from an airborne craft, the multispectral image including multiple bands in a visible spectrum and multiple bands in an infrared spectrum; pre-processing the multispectral image including mitigating the effects of water vapor in an atmosphere captured by the multispectral image; performing a process to identify a first set of pixels in the preprocessed multispectral image that represent instances of the material; performing a process to identify a second set of pixels in the preprocessed multispectral image that represent non-instances of the material; using the first set of pixels from the preprocessed multispectral image and the second set of pixels from the preprocessed multispectral image to train a classification model to produce a trained classifier; and using the trained classifier to identify additional pixels in the preprocessed multispectral image that represent the material.

One embodiment includes a processor connected to a storage device (e.g., memory, hard disk drive, solid state drive, other type of flash memory) and a communication interface. The storage device stores code to program the processor to perform the methods described above.

For purposes of this document, it should be noted that the dimensions of the various features depicted in the figures may not necessarily be drawn to scale.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more others parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element. Two devices are "in communication" if they are directly or indirectly connected so that they can communicate electronic signals between them.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

For purposes of this document, the term "set" of objects may refer to a "set" of one or more of the objects.

The foregoing detailed description has been presented for purposes of illustration and description. It is not intended to be exhaustive or to limit the subject matter claimed herein to the precise form(s) disclosed. Many modifications and variations are possible in light of the above teachings. The described embodiments were chosen in order to best explain the principles of the disclosed technology and its practical application to thereby enable others skilled in the art to best utilize the technology in various embodiments and with various modifications as are suited to the particular use contemplated. It is intended that the scope of be defined by the claims appended hereto.

What is claimed is:

1. A method for identifying a material in an image, comprising:
   accessing a first image;
   automatically performing a first process to identify a first set of pixels in the first image that represent instances of the material;
   automatically using the first set of pixels in the first image to train a classification model to create a trained classifier specifically for the first image, the trained classifier being different than the first process, the automatically using the first set of pixels in the first image to train the classification model comprises training an untrained classification model using the first set of pixels; and
   automatically using the trained classifier to identify additional pixels in the first image that represent the material.

2. The method of claim 1, wherein:
   the first process is a non-adaptive process.

3. The method of claim 1, wherein:
   the first image is a multispectral image taken from an airborne craft, the multispectral image includes multiple bands in a visible spectrum and multiple bands in an infrared spectrum; and
   the automatically using the trained classifier to identify the additional pixels in the first image comprises classifying pixels in the first image based on spectral information in four or more bands in the visible spectrum and two or more bands in the infrared spectrum.

4. The method of claim 3, further comprising:
   pre-processing the multispectral image including mitigating the effects of water vapor in an atmosphere captured by the multispectral image, the automatically performing the first process is performed on the pre-processed multispectral image, the automatically using the trained classifier is performed on the pre-processed multispectral image.

5. The method of claim 1, wherein:
   the automatically performing the first process to identify the first set of pixels in the first image comprises classifying pixels in the first image based on a non-spectral characteristic of the first image; and the automatically using the trained classifier to identify the additional pixels in the first image comprises classifying pixels in the first image based on a spectral characteristic of the first image.

6. The method of claim 1, further comprising:
generating an output mask that identifies the additional pixels.

7. The method of claim 1, wherein:
the material is asphalt.

8. A method for identifying a material in an image, comprising:
accessing a first image;
automatically performing a first process to identify a first set of pixels in the first image that represent instances of the material;
automatically using the first set of pixels in the first image to train a classification model to create a trained classifier specifically for the first image, the trained classifier being different than the first process;
automatically performing a second process to identify a second set of pixels in the first image that represent non-instances of the material, the automatically using the first set of pixels in the first image to train the classification model comprises using the first set of pixels in the first image and the second set of pixels in the first image to train the classification model;
automatically using the trained classifier to identify additional pixels in the first image that represent the material;
accessing a second image;
automatically performing the first process to identify a third set of pixels in the second image that represent instances of the material;
after the automatically using the first set of pixels in the first image to train the classification model, automatically using the third set of pixels to train a version of the classification model that has not been trained by the first set of pixels to create a newly trained classifier; and
automatically using the newly trained classifier to identify a fourth set of pixels in the second image that represent instances of the material.

9. The method of claim 8, wherein:
the first process and the second process are each non-adaptive processes that are performed independently.

10. The method of claim 8, further comprising:
accessing additional images; and
training the classification model to identify pixels in the additional images that represent instances of the material prior to the automatically using the first set of pixels in the first image to train the classification model, the automatically using the first set of pixels in the first image to train the classification model comprises creating the trained classifier that has not been trained using data from other images of the additional images.

11. A method for identifying a material in an image, comprising:
accessing multiple multispectral images, each of the multispectral images comprising multiple bands; and
for each of the multispectral images:
identifying first pixels in the respective multispectral image that represent instances of the material,
using the first pixels to train a classification model to create a respective trained classifier that has not been trained using data from a previous image of the accessed multiple multispectral images, and
using the respective trained classifier to identify additional pixels in the multispectral image.

12. The method of claim 11, wherein:
the identifying first pixels is a non-adaptive process.

13. The method of claim 11, wherein:
the multispectral images are images of Earth taken from a satellite, the multispectral image includes multiple bands in a visible spectrum and multiple bands in an infrared spectrum; and
the using the respective trained classifier to identify additional pixels comprises classifying pixels based on spectral information in four or more bands in the visible spectrum and two or more bands in the infrared spectrum.

14. The method of claim 13, further comprising:
pre-processing the multispectral images including mitigating the effects of noise due to water vapor, the identifying first pixels is performed on the pre-processed multispectral images, the using the respective trained classifier to identify additional pixels is performed on the pre-processed multispectral images.

15. A non-transitory processor readable storage device having processor readable code embodied on the processor read storage device, the processor readable code for programming one or more processors to perform a method comprising:
accessing a multispectral image taken from an airborne craft, the multispectral image including multiple bands in a visible spectrum and multiple bands in an infrared spectrum;
pre-processing the multispectral image including mitigating the effects of water vapor in an atmosphere captured by the multispectral image;
performing a process to identify a first set of pixels in the pre-processed multispectral image that represent instances of the material;
performing a process to identify a second set of pixels in the pre-processed multispectral image that represent non-instances of the material;
using the first set of pixels from the pre-processed multispectral image and the second set of pixels from the pre-processed multispectral image to train a classification model to produce a trained classifier; and
using the trained classifier to identify additional pixels in the pre-processed multispectral image that represent the material.

16. The non-transitory processor readable storage device of claim 15, wherein the method further comprises
accessing additional multispectral images; and
training the classification model to identify pixels in the additional images that represent instances of the material prior to the using the first set of pixels from the pre-processed multispectral image and the second set of pixels from the pre-processed multispectral image to train the classification model, the using the first set of pixels from the pre-processed multispectral image and the second set of pixels from the preprocessed multispectral image to train the classification model comprises creating the trained classifier that has not been trained using data from other images of the additional images.

17. The non-transitory processor readable storage device of claim 15, wherein:
the using the trained classifier to identify the additional pixels in the pre-processed multispectral image comprises classifying pixels in the pre-processed multispectral image based on spectral information in four or more bands in the visible spectrum and two or more bands in the infrared spectrum.

* * * * *